United States Patent
Ohata et al.

(10) Patent No.: US 10,582,079 B2
(45) Date of Patent: Mar. 3, 2020

(54) IMAGE FORMING APPARATUS, METHOD FOR CONTROLLING IMAGE FORMING APPARATUS, AND RECORDING MEDIUM

(71) Applicant: KONICA MINOLTA, INC., Chiyoda-ku, Tokyo (JP)

(72) Inventors: Tsutomu Ohata, Toyokawa (JP); Tomoaki Yamada, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/690,939

(22) Filed: Aug. 30, 2017

(65) Prior Publication Data

US 2018/0063349 A1 Mar. 1, 2018

(30) Foreign Application Priority Data

Aug. 31, 2016 (JP) ................................. 2016-169909

(51) Int. Cl.
*G06F 3/12* (2006.01)
*H04N 1/00* (2006.01)

(52) U.S. Cl.
CPC ..... *H04N 1/00888* (2013.01); *H04N 1/00891* (2013.01); *H04N 1/00896* (2013.01); *H04N 2201/0094* (2013.01)

(58) Field of Classification Search
None
See application file for complete search history.

(56) References Cited

U.S. PATENT DOCUMENTS

2011/0083027 A1* 4/2011 Takagi .................. G06F 1/3284
713/323
2012/0300237 A1* 11/2012 Yamamoto ......... H04N 1/00236
358/1.13
(Continued)

FOREIGN PATENT DOCUMENTS

CN 1987736 6/2007
CN 101118459 2/2008
(Continued)

OTHER PUBLICATIONS

Notification of the First Office Action issued in corresponding Chinese Patent Application No. 2017110553777, dated Jan. 28, 2019, with English Translation (28 pages).

*Primary Examiner* — Huo Long Chen
(74) *Attorney, Agent, or Firm* — Buchanan Ingersoll & Rooney PC

(57) ABSTRACT

An image processing apparatus includes a main hardware processor capable of controlling a first snapshot data acquisition process of storing to-be-saved information regarding the image forming apparatus as first snapshot data in a non-volatile storage device in response to a turn-off operation of a main power switch, and a sub hardware processor capable of monitoring an operating state of the main power switch in a power-saving state of the image forming apparatus. After the turn-off operation is detected in the power-saving state, the main hardware processor starts a return process of causing the state of the image forming apparatus to return from the power-saving state. When a turn-on operation of the main power switch is detected after the turn-off operation is detected in the power-saving state and before the return process is completed, the sub hardware processor resets the main hardware processor in response to the turn-on operation.

12 Claims, 15 Drawing Sheets

(56) References Cited

U.S. PATENT DOCUMENTS

| | | |
|---|---|---|
| 2012/0320402 A1 | 12/2012 | Okuzono et al. |
| 2013/0091372 A1* | 4/2013 | Kimura ................... G06F 1/32 |
| | | 713/340 |
| 2013/0139212 A1* | 5/2013 | Yukawa ............... H04N 21/443 |
| | | 725/131 |
| 2013/0166935 A1* | 6/2013 | Imaizumi .............. G06F 1/3268 |
| | | 713/323 |
| 2013/0305069 A1 | 11/2013 | Goda |
| 2016/0057304 A1* | 2/2016 | Yamaguchi ........ H04N 1/00891 |
| | | 358/1.14 |
| 2016/0219175 A1* | 7/2016 | Uchida ............. H04N 1/00896 |
| 2017/0176920 A1 | 6/2017 | Okuzono et al. |

FOREIGN PATENT DOCUMENTS

| | | |
|---|---|---|
| CN | 104076633 | 10/2014 |
| JP | 2013-020606 A | 1/2013 |
| JP | 2013-222394 A | 10/2013 |

* cited by examiner

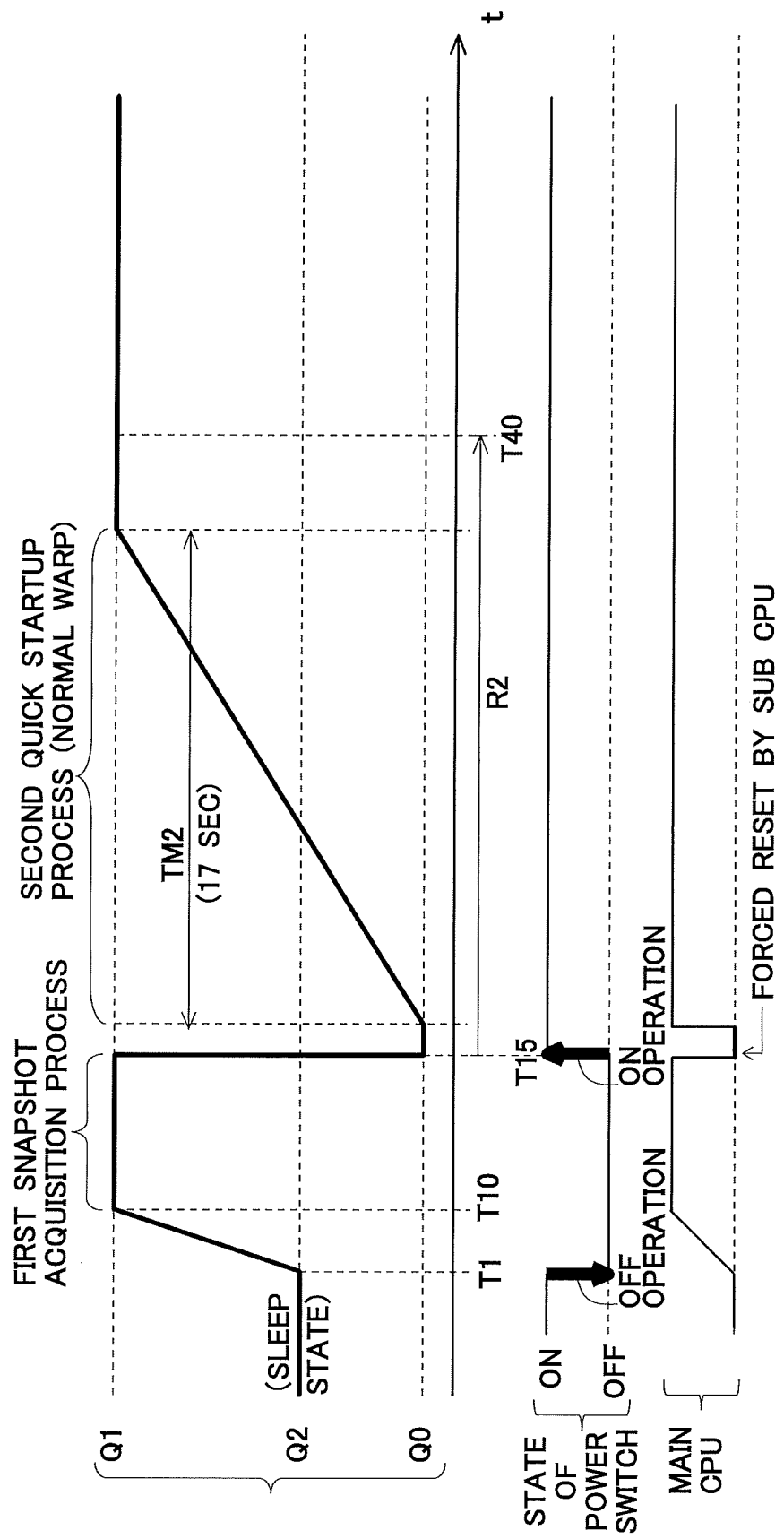

IMAGE FORMING APPARATUS, METHOD FOR CONTROLLING IMAGE FORMING APPARATUS, AND RECORDING MEDIUM

Japanese Patent Application No. 2016-169909 filed on Aug. 31, 2016, including description, claims, drawings, and abstract the entire disclosure is incorporated herein by reference in its entirety.

BACKGROUND

Technological Field

The present invention relates to an image forming apparatus such as a Multi-Functional Peripheral (MFP) and techniques related thereto.

Description of the Related Art

There is quick startup technology (also referred to as "hibernation starting technology") for enabling users to use the functions of an MFP in a short time at the turning on of a main power supply of the MFP (see, for example, Japanese Patent Application Laid-Open Nos. 2013-222394 and 2013-20606).

With this quick startup technology, in response to an operation (turn-off operation) to turn off a main power switch, a period of time (power supply duration) during which power supply continues even after the turn-off operation is provided, instead of immediately stopping power supply, and a process of storing device status information (also referred to as "to-be-saved information") is performed during that period. To be more specific, as a preparation to the next turning on of the main power switch, a process (also referred to as a "snapshot data acquisition process") is performed in which device status information (e.g., data stored in a RAM of a controller and data stored in the register of each processing unit) obtained when the main power switch is turned off, for example, is stored in a nonvolatile storage unit. When the main power switch is turned on next time, the device status information (snapshot data) acquired in the immediately previous snapshot data acquisition process is used. This enables the MFP to quickly return to its startup state (to be more specific, a state (ready state) in which the MFP is capable of executing jobs).

There are cases where a "turn-on operation" of the main power switch may be performed (next time) before the snapshot data acquisition process is completed (in particular, immediately after the turn-off operation). For example, a user who has turned off the main power switch may notice some kind of imperfection or other defects in printed matter and turn on the main power switch in haste for reprinting.

In this case, if the operations as described above are performed, a snapshot data acquisition process is started in response to the turn-off operation of the main power switch, and after the snapshot data acquisition process is completed, then a quick startup process (to be more specific, a first quick startup process, which will be described later) is performed in response to the turn-on operation of the main power switch (see FIG. 8, which will be described later).

However, when a turn-on operation of the main power switch is performed before the snapshot data acquisition process corresponding to the turn-off operation of the main power switch is completed (in particular, for example when the main power switch are turned off and on within a relatively short time interval), it may take a considerable amount of time to complete both of the snapshot data acquisition process and the quick startup process and to make the image forming apparatus return to its ready state (startup state). That is, a relatively long time may be required for the image forming apparatus to return to its normally activated state (ready state) (the users' standby time increases).

Incidentally, when the MFP in the activated state (ready state) is not operated for a certain period of time, the MFP will transition to its sleep state (power-saving state) in which power supply to some processing circuits or other components is stopped, due to for example the demand to reduce power consumption. In the sleep state, power supply to the CPU, which controls the aforementioned snapshot data acquisition process, is also stopped.

When a turn-off operation of the main power switch is performed in this sleep state, the snapshot data acquisition process is performed only after the MFP has returned from the sleep state to the ready state.

Even in the case where a turn-off operation of the main power switch is performed in the sleep state (power-saving state), a "turn-on operation" of the main power switch may be performed (next time) before the snapshot data acquisition process is completed (in particular, immediately after the turn-off operation) as described above.

In this case, the processes as described above are executed after execution of a process (return-from-sleep process) of causing the MFP to return from the sleep state in response to the turn-off operation of the main power switch. More specifically, a snapshot data acquisition process is started, and after the snapshot data acquisition process is completed, then a quick startup process (first quick startup process, which will be described later) is performed in response to the turn-on operation of the main power switch (see FIG. 8, which will be described later).

However, in this situation, there is also the aforementioned problem, and in particular, the users' standby time may further increase due to involvement of the return-from-sleep process.

SUMMARY

In view of the above, it is an object of the present invention to provide a technique capable of suppressing an increase in the starting time of the image forming apparatus in the case where a turn-on operation of the main power switch is performed after a turn-off operation of the main power switch is performed in the power-saving state.

According to a first aspect of the present invention, an image forming apparatus includes a main hardware processor capable of controlling a first snapshot data acquisition process in which, in response to a turn-off operation to turn off a main power switch, to-be-saved information regarding the image forming apparatus is stored as first snapshot data in a nonvolatile storage device, and a sub hardware processor capable of monitoring an operating state of the main power switch in a power-saving state of the image forming apparatus, the power-saving state involving powering off the main hardware processor. The main hardware processor starts a return process after the sub hardware processor has detected the turn-off operation in the power-saving state, the return process being a process of causing a state of the image forming apparatus to return from the power-saving state to a predetermined state to execute the first snapshot data acquisition process. In a case where a turn-on operation to turn on the main power switch is detected after the turn-off operation is detected in the power-saving state and before the return process of return from the power-saving state is completed, the sub hardware processor resets the main hardware processor in response to the turn-on operation.

A second aspect of the present invention is a method for controlling an image forming apparatus. The image forming apparatus includes a main hardware processor capable of controlling a first snapshot data acquisition process in which, in response to a turn-off operation to turn off a main power switch, to-be-saved information regarding the image forming apparatus is stored as first snapshot data in a nonvolatile storage device, and a sub hardware processor capable of monitoring an operating state of the main power switch in a power-saving state of the image forming apparatus, the power-saving state involving powering off the main hardware processor. The control method includes a) causing the main hardware processor to start a return process after the sub hardware processor has detected the turn-off operation in the power-saving state, the return process being a process of causing a state of the image forming apparatus to return from the power-saving state to a predetermined state to execute the first snapshot data acquisition process, and b) in a case where a turn-on operation to turn on the main power switch is detected after the turn-off operation is detected in the power-saving state and before the return process of return from the power-saving state is completed, causing the sub hardware processor to reset the main hardware processor in response to the turn-on operation.

According to a third aspect of the present invention, a non-transitory computer-readable recording medium that records a program for controlling an image forming apparatus that includes a main hardware processor and a sub hardware processor to execute the following operation. The main hardware processor is capable of controlling a first snapshot data acquisition process in which, in response to a turn-off operation to turn off a main power switch, to-be-saved information regarding the image forming apparatus is stored as first snapshot data in a nonvolatile storage device. The sub hardware processor is capable of monitoring an operating state of the main power switch in a power-saving state of the image forming apparatus, the power-saving state involving powering off the main hardware processor. The above operation includes a) causing the main hardware processor to start a return process after the sub-hardware processor has detected the turn-off operation in the power-saving state, the return process being a process of causing a state of the image forming apparatus to return from the power-saving state to a predetermined state to execute the first snapshot data acquisition process, and b) in a case where a turn-on operation to turn on the main power switch is detected after the turn-off operation is detected in the power-saving state and before the return process of return from the power-saving state is completed, causing the sub hardware processor to reset the main hardware processor in response to the turn-on operation.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 15 is a conceptual diagram illustrating operations according to a variation.

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment 1-1. Apparatus Configuration

Figure 1:
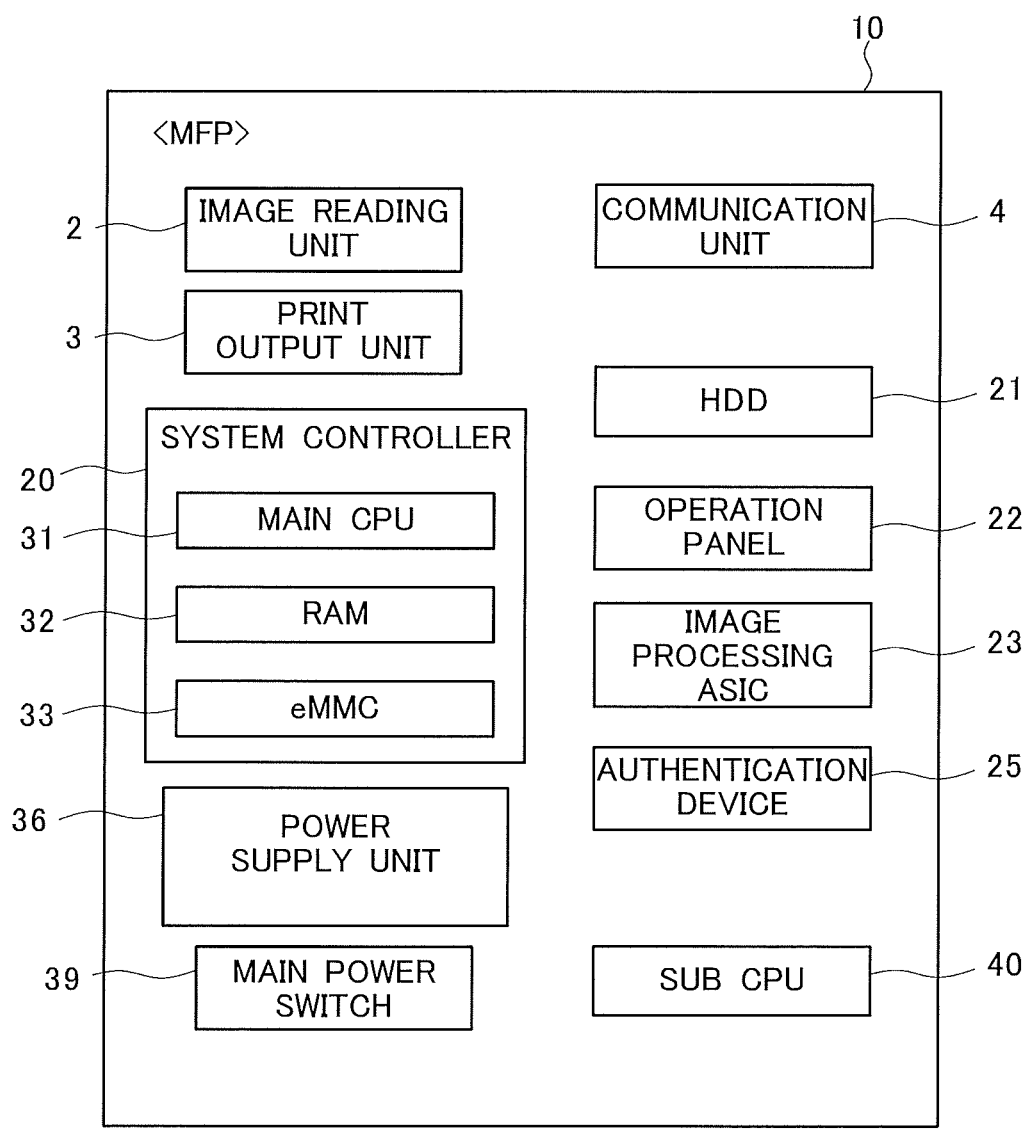
FIG. 1 illustrates functional blocks of an MFP (image forming apparatus).
Figure 2:
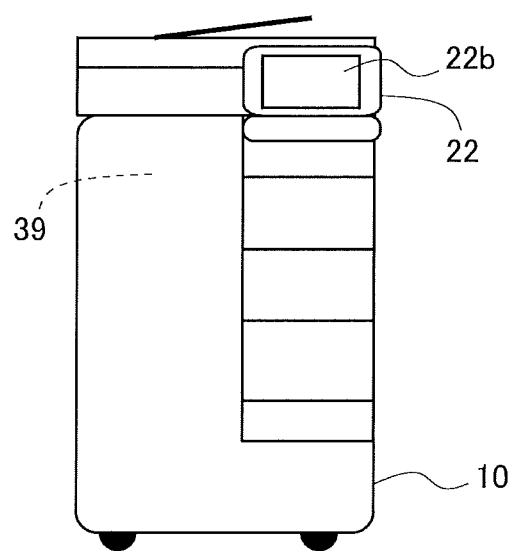
FIG. 2 is an external view of the MFP.

FIG. 1 illustrates functional blocks of an image forming apparatus 10. Here, a Multi-Functional Peripheral (MFP) is illustrated as an example of the image forming apparatus 10. FIG. 2 is an external view of the MFP 10.

The MFP 10 is an apparatus (also referred to as a "Multi-Functional Peripheral") having functions such as a scan function, a copy function, a facsimile function, and a box storage function. More specifically, the MFP 10 includes, for example, an image reading unit 2, a print output unit 3, a communication unit 4, a system controller 20, a hard disk drive (HDD) 21, an operation panel unit 22, an image processing application-specific integrated circuit (ASIC) 23, an authentication device 25, and a power supply unit 36 as illustrated in the functional block diagram in FIG. 1, and implements various types of functions by operating these units in combination.

The image reading unit 2 is a processing unit that optically reads (i.e., scans) an original document placed at a predetermined position on the MFP and generates image data (also referred to as an "original image" or "scanned image") of the original document. This image reading unit 2 is also referred to as a "scanning unit".

The print output unit 3 is an output unit that prints out an image on various types of media such as paper on the basis of data regarding an object to be printed.

The communication unit 4 is a processing unit capable of facsimile communication via a public network or other networks. The communication unit 4 is also capable of communication (network communication) via a communication network.

The hard disc drive (HDD) 21 is a nonvolatile storage device (storage unit) having a relatively large capacity and is capable of storing massive data such as images.

The operation panel unit 22 is an operation unit that includes a touch panel 22b on its front side as illustrated in FIG. 2. The touch panel 25 is configured by embedding, for example, various types of sensors in a liquid crystal display panel, and is capable of accepting various types of operation input from an operator while displaying various types of information. In other words, the touch panel 22b serves as not only a display unit that display various types of information, but also an operation input unit that accepts operation input from users.

The image processing ASIC 23 is an integrated circuit for image processing. The image processing ASIC 23 is capable of executing various types of image processing (e.g., γ correction, color control, and image compression) on image data.

The authentication device 25 is an authentication device (user authentication device) that is connected to the main body of the MFP 10 by a USB connection method or other connection methods. The authentication device 25 may be other devices using various types of user authentication methods such as card authentication or vein authentication.

The system controller 20 is a control device that is built into the MFP 10 and performs overall control of the MFP 10. The system controller 20 is configured as a computer system that includes, for example, a main CPU 31 and various types of semiconductor memories (e.g., volatile memories such as a RAM 32 and nonvolatile memories such as an embedded multi-media card (eMMC) 33). The system controller 20 implements various types of processing units by causing the main CPU 31 to execute predetermined software programs (hereinafter, also simply referred to as "programs") stored in the eMMC 33. These programs (to be more specific, a group of program modules) may be installed into the MFP 10 via a communication network. As another alternative, these programs may be recorded on a portable recording medium (in other words, one of various types of non-transitory computer-readable recording media) such as a USB memory and may be read out from the recording medium and installed into the MFP 10.

Figure 3:
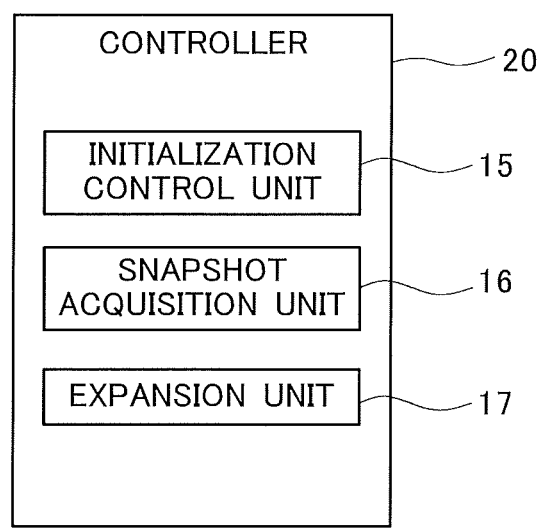
FIG. 3 illustrates various functional processing units implemented by a system controller.

More specifically, the system controller (e.g., main CPU 31) implements various types of processing units including an initialization control unit 15, a snapshot acquisition unit 16, and an expansion unit 17 as illustrated in FIG. 3 by executing the above programs.

The initialization control unit 15 is a processing unit that executes processing for initializing each device in the MFP 10.

The snapshot acquisition unit 16 is a processing unit that acquires, as snapshot data, device use information (information used by the apparatus 10, which includes the devices in the apparatus) regarding target processing units to be used in the snapshot acquisition process (e.g., all devices connected to the MFP 10, including those currently connected to the MFP 10 and those relating to optional configurations). The snapshot acquisition unit 16 stores (saves) the device use information regarding each unit of the MFP 10 as "snapshot data" in the eMMC 33. The device use information is also referred to as "to-be-saved information" because this information is target information in a saving process.

The expansion unit 17 executes a quick startup process in cooperation with the initialization control unit 15 or other units as necessary. For example, when a turn-on operation of the MFP 10 is performed after a turn-off operation of the MFP 10, the expansion unit 17 expands, in the MFP 10, snapshot data that is acquired in the snapshot acquisition process performed immediately after the turn-off operation. The use of the snapshot data enables quick activation of the MFP 10.

In the present embodiment, the snapshot data includes two types of snapshot data (first snapshot data and second snapshot data) as will be described later. The quick startup process of the MFP 10 using the snapshot data includes two types of quick startup processes (first quick startup process and second quick startup process) that respectively use the above two types of snapshot data.

The MFP 10 is also provided with a main power switch 39. The main power switch 39 (power switch) is a switch for switching between ON and OFF states of the MFP 10. The main power switch 39 may be a seesaw type switch. The main power switch 39 is provided in, for example, the main body of the MFP 10 covered with an openable cover member (e.g., on the inside of the cover member) in order to avoid operating errors or for other reasons.

The power supply unit 36 is capable of supplying power, which is supplied from an AC power supply, to each unit of the MFP 10. The power supply unit 36 interrupts power supply to, for example, the system controller 20 of the MFP 10 by turning off an electromagnetic relay. The power supply unit 36 controls power supply to each unit of the MFP 10 in cooperation with, for example, the main CPU 31 and a sub CPU 40, which will be described next.

The MFP 10 also includes the sub CPU 40. The sub CPU 40 is capable of monitoring the operating state of the main power switch 39 in, for example, the sleep state of the MFP 10 and is also capable of controlling power supply to each unit (e.g., main CPU 31) of the MFP 10 in cooperation with the power supply unit 36 or other units. Even in the sleep state of the MFP 10, power is supplied to the sub CPU 40 (i.e., the sub CPU 40 operates in its power-on state), and therefore the sub CPU 40 is capable of executing various types of operations (e.g., monitoring and determination).

The sub CPU 40 implements various types of processing units (e.g., power control unit) by executing predetermined programs stored in a predetermined storage unit (not shown) under its control. The power control unit controls a power supply operation in the MFP 10 in cooperation with the power supply unit 36, in particular, in a sleep state Q2 (and during the return-from-sleep process). These programs (to be more specific, a group of program modules) may be installed into the MFP 10 via a communication network. As another alternative, these programs may be recorded on a portable recording medium (in other words, one of various types of non-transitory computer-readable recording media) such as a USB memory and may be read out from the recording medium and installed into the MFP 10.

1-2. Operations

State (e.g., Ready State and Power-Saving State) of MFP

Figure 7:
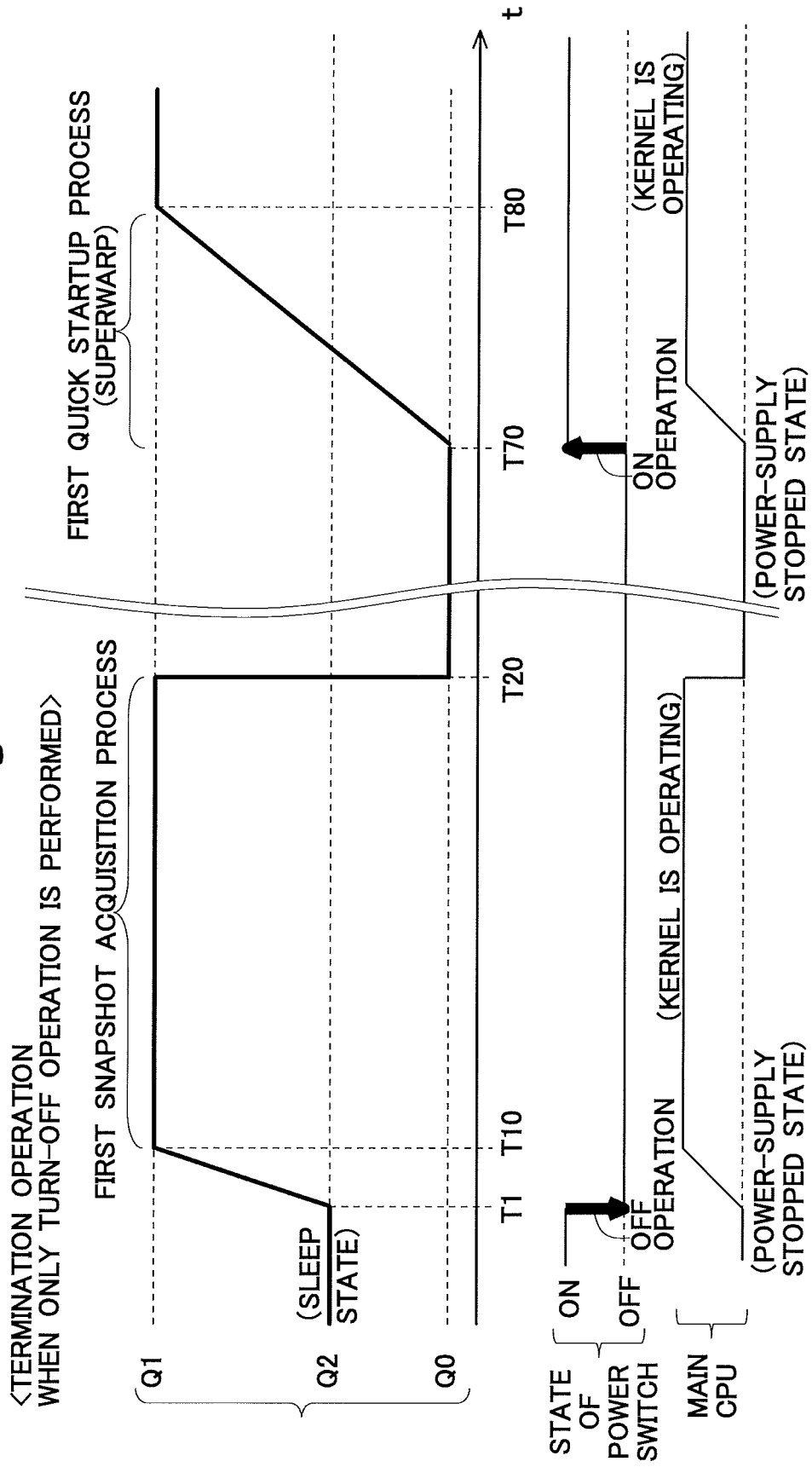
FIG. 7 is a diagram for describing basic operations performed after a turn-off operation of a main power switch is performed in the sleep state.
Figure 8:
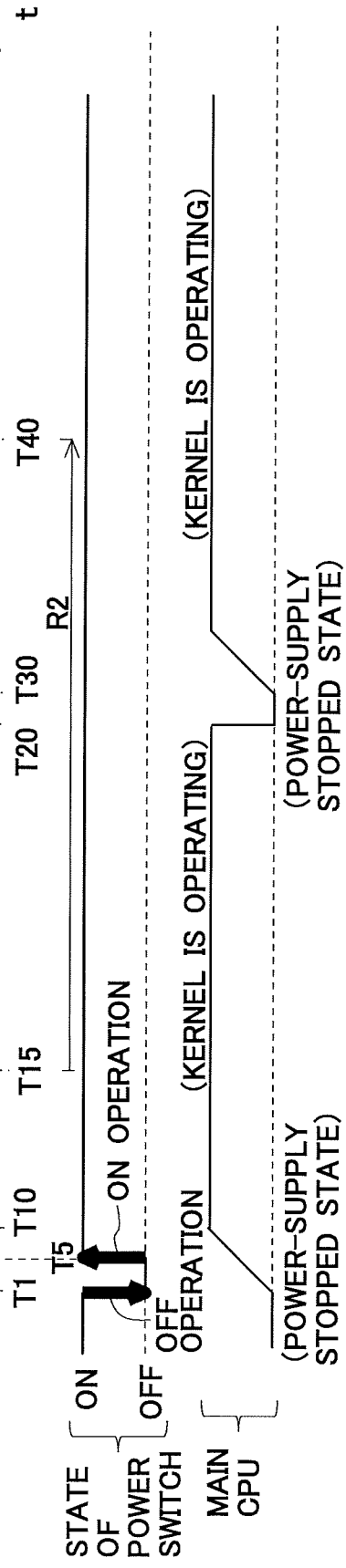
FIG. 8 illustrates operations according to a comparative example, performed when turn-off and turn-on operations of a switch are performed in succession in the sleep state.
Figure 9:
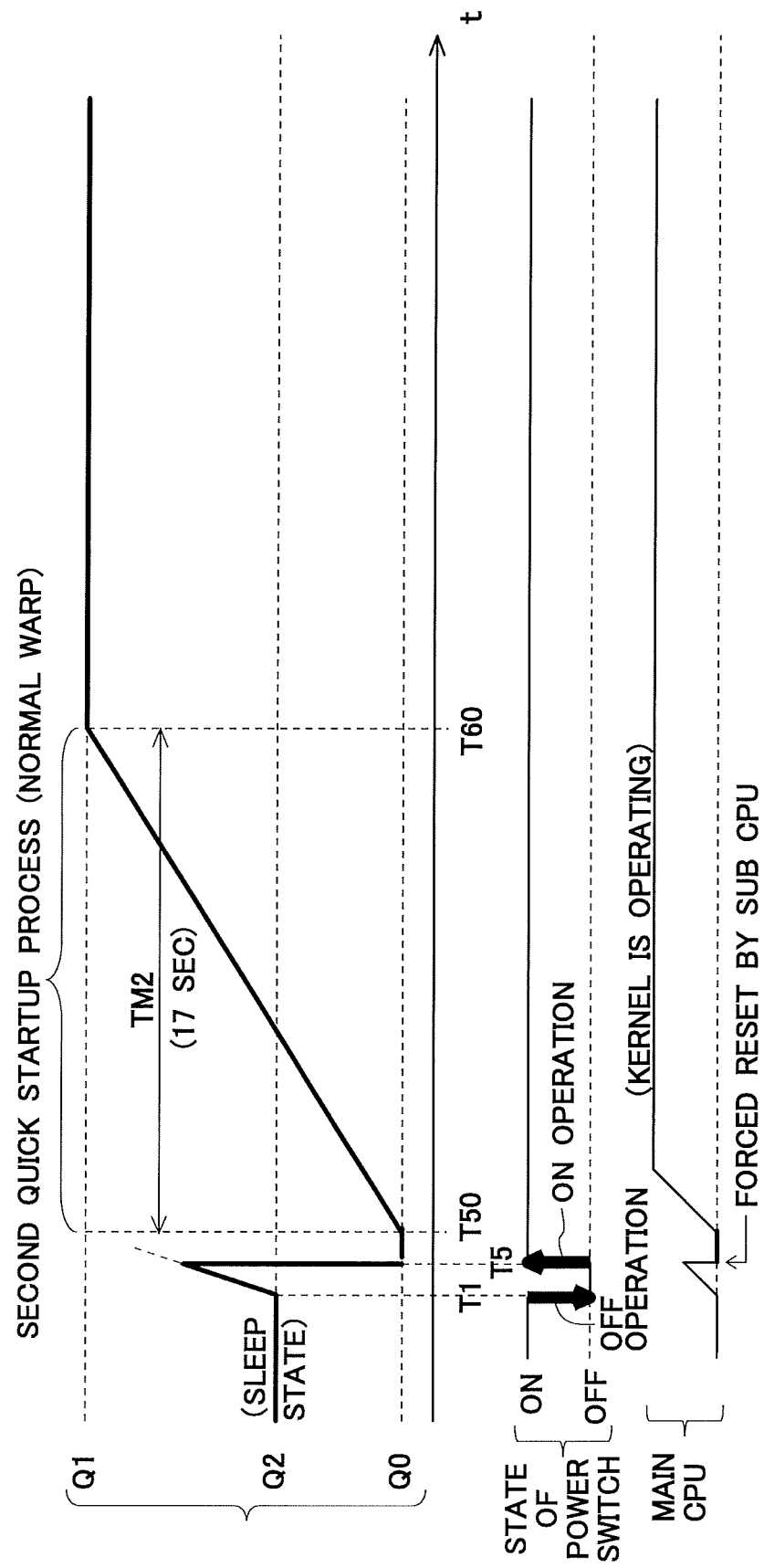
FIG. 9 is a conceptual diagram illustrating operations according to a first embodiment.

The MFP 10 has at least three states Q0, Q1, and Q2 (see, for example, FIGS. 7 to 9).

The state Q0 is a state in which the MFP 10 is completely stopped, and is also referred to as a "stopped state (or OFF state)."

The state Q1 is a state (standby state) in which the MFP 10 is in its normally activated state and waits for various types of processing. The standby state Q1 is a state in which each function of the MFP 10 is available, or in other words, a state in which the MFP 10 is capable of executing jobs (state in which the MFP 10 has completed a preparation to execute jobs), and is also referred to as a "ready state."

The other state Q2 is a non-stopped state in which the MFP 10 has lower power consumption than in the standby state (ready state) Q1, and is also referred to as a "power-saving state." The power-saving state Q2 is also referred to as a "sleep state." The sleep state Q2 is implemented by, for example, stopping or suppressing power supply to some devices (processing circuits) of the MFP 10.

Two Types of Snapshot Data and Two Types of Quick Startup

In the present embodiment, the snapshot data includes two types of snapshot data. The quick startup process using the snapshot data for the MFP 10 includes two types of quick startup processes (first quick startup process and second quick startup process) that respectively use the two types of snapshot data.

The first quick startup process is a startup process that runs at a higher speed than the second quick startup process, and is executed based on the first snapshot data. The second quick startup process is, on the other hand, executed based on the second snapshot data. The second quick startup process is a startup process that runs at a higher speed than a normal startup process using no snapshot data at all, but runs at a lower speed than the first quick startup process. For example, the second quick startup process allows the MFP to be activated in a shorter time (e.g., 17 seconds) than the starting time (1 minute) in the normal startup process, and the first quick startup process allows the MFP to be activated in a yet shorter time (e.g., 9 seconds). Note that the second quick startup process runs at a higher speed than the normal startup process (startup process using no snapshot data at all).

The first snapshot data includes the second snapshot data and further includes more save data.

More specifically, the second snapshot data includes to-be-saved information regarding common processing units that are independent of optical configurations of the MFP 10 among the units of the MFP 10. In contrast, the first snapshot data includes, in addition to the to-be-saved information regarding the common processing units, to-be-saved information regarding processing units that are dependent on optional configurations of the MFP 10 (e.g., optional devices, such as USB connection equipment including the authentication device, that are actually mounted on the MFP 10 at that time) among the units of the MFP 10.

The second quick startup process executes an operation of quickly activating the common processing units (also referred to as "common parts"), using the second snapshot data. The second quick startup process using the second snapshot data allows the states of the common parts to transition to their original states (e.g., more specifically, activated states immediately before a turn-off operation of the main power switch 39) more quickly than in the case where processing is performed normally such as initializing the "common parts" independent of the configurations of the optional devices.

The first quick startup process executes an operation of quickly activating both of the common processing units (also referred to as "common parts") and "non-common parts" that are dependent on the configurations of the optional devices, using the first snapshot data. The first quick startup process using the first snapshot data allows the states of the optional devices to transition to their original states (e.g., more specifically, activated states immediacy before the turn-off operation of the main power switch 39) more quickly than in the case of the second quick startup process (process in which the common parts are quickly activated using the second snapshot data, and processing is performed normally such as initializing each optional device). That is, the first quick startup process allows the MFP to be activated in a shorter time than the second quick startup process.

The second quick startup process is also referred to as a "normal warp process," and the first quick startup process is also referred to as a "superwarp process." The second snapshot data is acquired in, for example, a state immediately after a turn-on operation (immediately after transition to the ready state). The first snapshot data is acquired immediately after a turn-off operation of the main power switch 39 and used in, for example, the first quick startup process that is performed immediately after the next turn-on operation of the main power switch 39. When it is unable to acquire the first snapshot data, the second snapshot data acquired in advance (e.g., immediately after the previous startup) is used to execute the second quick startup process in the startup process that is performed immediately after the next turn-on operation.

Turn-Off Operation in Ready State

Figure 4:
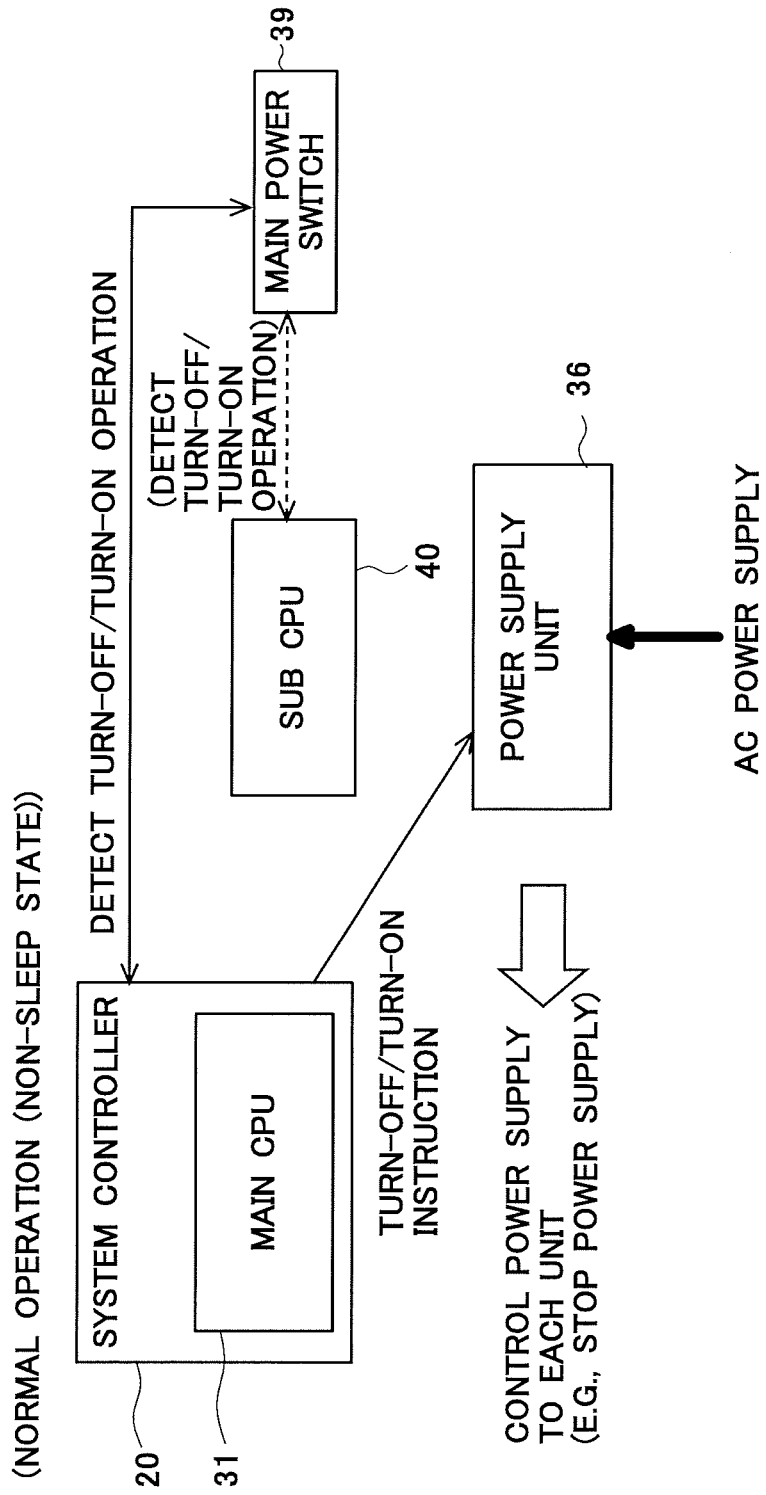
FIG. 4 is a conceptual diagram illustrating power control operations performed during a normal operation.

FIG. 4 is a conceptual diagram illustrating a power control operation performed during a normal operation. As illustrated in FIG. 4, when the MFP 10 is in the ready state Q1, the main CPU 31 detects turn-off and turn-on operations of the main power switch 39. Then, the main CPU 31 controls power supply to each unit of the MFP 10 in cooperation with the power supply unit 36 in accordance with the detection result.

If a turn-off operation of the main power switch 39 is performed in the ready state Q1 of the MFP 10, the main CPU 31 immediately starts a snapshot data acquisition process (to be more specific, first snapshot data acquisition process) in response to the turn-off operation. When the snapshot data acquisition process is completed, the power supply unit 36 stops power supply to almost all of the processing units including the main CPU 31 and causes the MFP 10 to transition to the state Q0 (see FIG. 4).

If a turn-on operation of the main power switch 39 is performed thereafter, the main CPU 31 determines, as a general rule, to execute the first quick startup process using the first snapshot data, and executes the first quick startup process. This allows the MFP 10 to transition at an extremely high speed from the stopped state Q0 to the ready state Q1.

Turn-Off Operation in Sleep State

Next, operations that are performed when a turn-off operation of the main power switch 39 is performed in the sleep state Q2 will be described with reference to FIG. 7. FIG. 7 is a diagram for describing basic operations that are performed after a turn-off operation of the main power switch 39 is performed in the sleep state Q2.

In the present embodiment, power supply to the main CPU 31 is stopped in a situation where the MFP 10 is in the sleep state Q2 (see the left end side in FIG. 7). That is, the main CPU 31 is in a power-off state (power-supply stopped state) in the sleep state Q2 of the MFP 10 (see FIG. 6).

If a turn-off operation of the main power switch 39 is performed (see time T1 in FIG. 7, for example) in the sleep state Q2 of the MFP 10, a return-from-sleep process (return process of return from the sleep state to the ready state) needs to be performed in order for the main CPU 31 to execute the first snapshot data acquisition process. The return-from-sleep process involves various types of processing such as restarting power supply to the main CPU 31 in the power-off state (power-supply stopped state), booting the main CPU 31, and causing the kernel of the main CPU 31 to return to a predetermined state (normal operating state).

When the main CPU 31 has returned from the sleep state Q2 to the ready state Q1 (time T10), the main CPU 31 executes the same process as described above. More specifically, the first snapshot data acquisition process (process of acquiring the first snapshot data) is started, and when the first snapshot data acquisition process is completed (time T20), power supply is stopped and the MFP 10 transitions to the state Q0.

If a turn-on operation of the main power switch 39 is performed (time T70) thereafter as illustrated on the right side in FIG. 7, the main CPU 31 determines, as a general rule, to execute the first quick startup process using the first snapshot data, and executes the first quick startup process (times T70 to T80). That is, when the next turn-on operation of the main power switch 39 is performed after the first snapshot data acquisition process is completed, the MFP 10 is quickly activated using the first snapshot data.

Comparative Example

Turn-Off Operation and Immediately Following Turn-On Operation in Sleep State

Next is a description of operations that are performed when turn-off and turn-on operations of the main power switch 39 are performed within a short time interval in the sleep state Q2. In this comparative example, the sub CPU 40 is not provided, and the main CPU 31 manages turn-on and turn-off operations of the main power switch 39.

First, operations according to the "comparative example" will be described with reference to FIG. 8. FIG. 8 illustrates operations according to the comparative example, which are performed when a turn-off operation of the main power switch 39 is performed at time T1 in the sleep state Q2, and then a turn-on operation of the main power switch 39 is performed at time T5 within a very short time interval ΔT (e.g., 0.5 seconds).

In FIG. 8, first, a process corresponding to the turn-off operation of the main power switch 39 is performed (time T1). More specifically, a process of return from the sleep state Q2 is executed (times T1 to T10), and then the first snapshot data acquisition process is executed (times T10 to T20). Although the turn-on operation of the main power switch 39 has already been performed at time T5 (time before time T10), the execution of a process corresponding to this turn-on operation is put on hold (until time T20).

When the first snapshot data acquisition process is completed (time T20), then the process corresponding to the turn-on operation of the main power switch 39 is executed. More specifically, an operation of resetting the main CPU 31 (times T20 to T30) and the first quick startup process or superwarp process (times T30 to time T40) are executed.

According to the comparative example, as described above, the start of the process (e.g., first quick startup process) corresponding to the turn-on operation of the main power switch 39 (time T5) is put on hold until the process (e.g., snapshot data acquisition process) corresponding to the immediately previous turn-off operation (detected at time T1) is completed (T20).

The first snapshot data acquisition process may take a relatively long time (e.g., 20 seconds).

There is a high possibility that the user who has turned on the main power switch 39 immediately after the turning off of the main power switch 39 has an intention of relatively quickly starting to use the MFP 10. Nevertheless, if the first snapshot data acquisition process and other processing continue for a relatively long time (e.g., 20 seconds), the user's standby time increases. More specifically, a total processing time of the first snapshot data acquisition process and the first quick startup process becomes a relatively large value (approximately 29 seconds). Thus, the user becomes tired of waiting.

Present Embodiment

Turn-Off Operation and Immediately Following Turn-On Operation in Sleep State

In contrast to the above example, according to the present embodiment, operations as illustrated in FIG. 9 are performed when a turn-on operation of the main power switch 39 is detected after a turn-off operation of the main power switch 39 is detected in the sleep state Q2. More specifically, if this turn-on operation is detected before the process of return from the sleep state Q2 is completed (see times T1 to T10 in FIG. 8), the main CPU is reset (immediately) in response to this turn-on operation (time T5). In short, when the main power switch 39 is turned off and on in succession within a short time interval in the sleep state Q2, the main CPU 31 is reset at the time of the turn-on operation (see FIGS. 9 and 10).

To be more specific, the sub CPU 40 is used to monitor the state of the main power switch 39 in the sleep state Q2. When a turn-off operation of the main power switch 39 is detected, the sub CPU 40 transmits an instruction for the return from the sleep state to, for example, the main CPU 31. In response to this instruction from the sub CPU 40, the main CPU 31 starts a process of return from the sleep state Q2. Thereafter, if a turn-on operation of the main power switch 39 is detected following the turn-off operation of the main power switch 39 before the process of return from the sleep state Q2 is completed (before the kernel of the main CPU 31 returns to a predetermined state), the sub CPU 40 immediately resets the main CPU 31.

In this way, the return-from-sleep process, which was started in response to the turn-off operation of the main power switch 39 (time T1), is interrupted at an early stage (time T5 in FIG. 9). It is thus possible to suppress an increase in standby time, which may occur when the return-from-sleep process and the subsequent snapshot data acquisition process are executed in succession.

Hereinafter, the operations according to the first embodiment will be described in more detail with reference to FIGS. 9 and 10. FIG. 9 is a conceptual diagram illustrating the operations according to the first embodiment, and FIG. 10 is a flowchart of the operations performed by the sub CPU 40.

Figure 5:
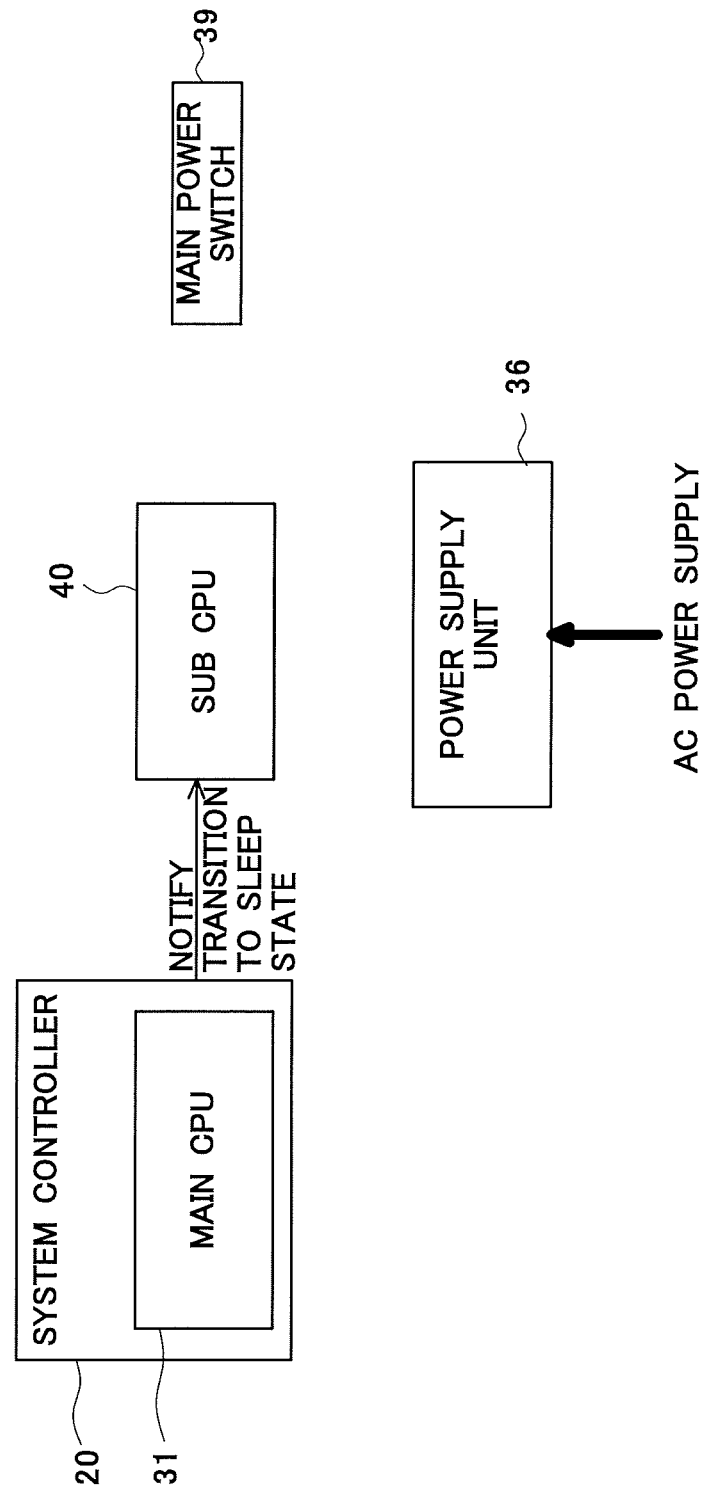
FIG. 5 is a conceptual diagram illustrating operations performed immediately before the MFP transitions to its sleep state.

In embodiments of the present invention, it is assumed that the main CPU 31 transmits a notification of transition to the sleep state to the sub CPU 40 immediately before its transition to the sleep state Q2, and the sub CPU 40 that has received this notification of transition stores the state (sleep state) of the main CPU 31 (see FIG. 5).

In FIG. 9, the main power switch 39 is operated in the same manner as in FIG. 8. More specifically, the main power switch 39 is turned off at time T1 in the sleep state Q2, and then turned on at time T5 within a very short time interval ΔT (e.g., 0.5 seconds). In the present embodiment, the sub CPU 40 detects the operations of the main power switch 39 in at least the sleep state Q2.

Figure 10:
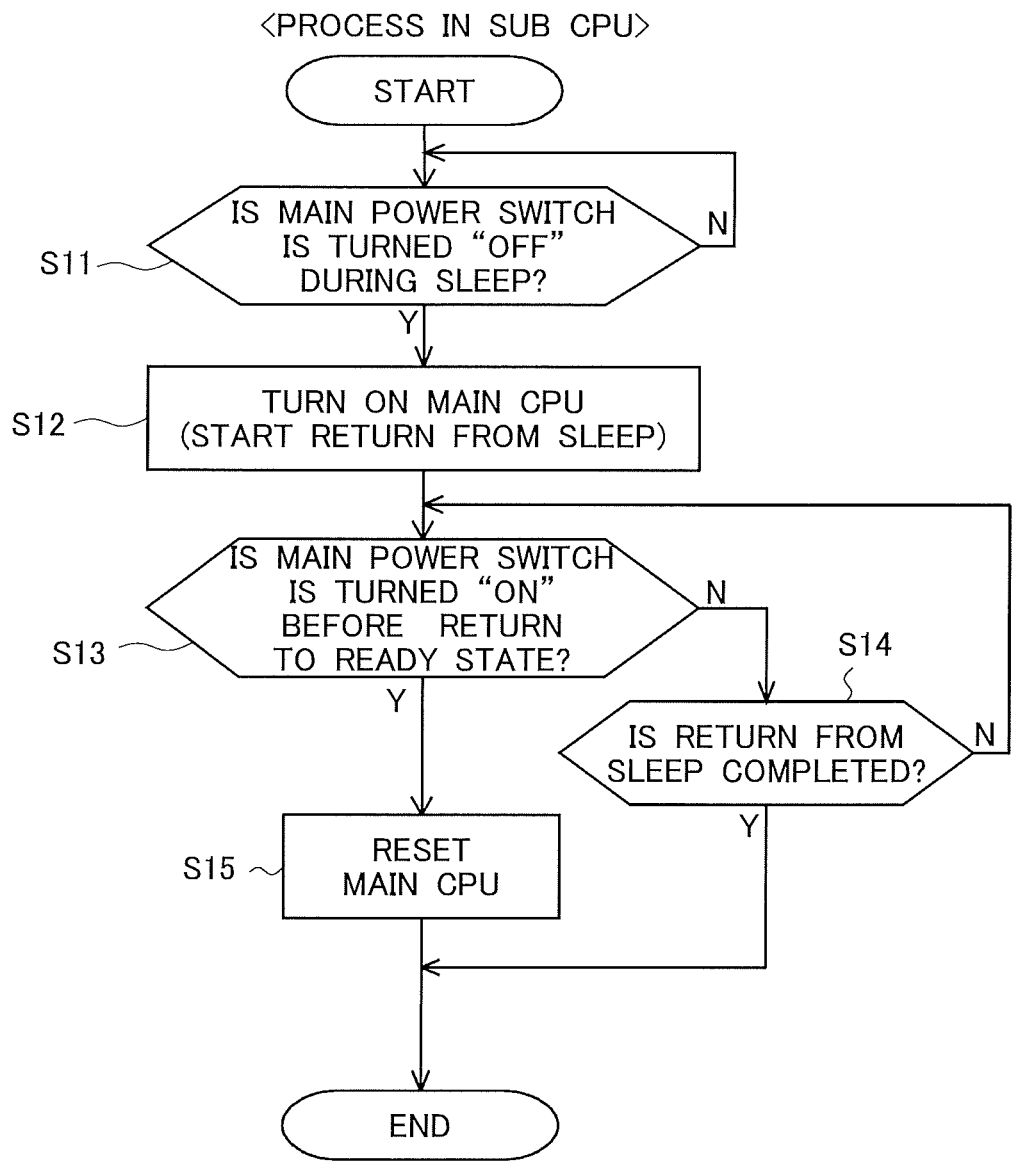
FIG. 10 is a flowchart of operations performed by the sub CPU.

To be more specific, when the turn-off operation of the main power switch 39 is performed at time T1 in the sleep state of the MFP 10, the sub CPU 40 detects this turn-off operation (i.e., a change in the state of the main power switch 39, i.e., change to the OFF state) (see also step S11 in FIG. 10).

When the turn-off operation of the main power switch 39 (time T1) is detected in the sleep state Q2, the sub CPU 40 activates the main CPU 31 and causes the main CPU 31 to start a return process (step S12).

More specifically, the sub CPU 40 transmits a return-from-sleep instruction to cause the main CPU 31 to return from the sleep state to the power supply unit 36 in order to activate the main CPU 31 to start the snapshot data acquisition process (see FIG. 8), and in response to this return-from-sleep instruction, the power supply unit 36 restarts power supply to the main CPU 31 via the power supply unit 36.

In response to this, the main CPU 31 starts a return-from-sleep process (return process in which the MFP 10 returns from the sleep state Q2 to the ready state Q1). The return-from-sleep process involves various types of processing such as booting the main CPU 31 and causing the kernel of the main CPU 31 to transition to a predetermined state (normally activated state). Here, the return-from-sleep process is a process of causing the state of the MFP 10 to return from the sleep state Q2 to the ready state Q1, in order to execute the first snapshot data acquisition process. The return-from-sleep process may take approximately one to several seconds (e.g., 1.3 seconds).

In this way, the process (e.g., process of return from the sleep state Q2) corresponding to the turn-off operation of the main power switch 39 (time T1) is first started.

If this return-from-sleep process is completed without the sub CPU 40 or other units detecting a turn-on operation of the main power switch 39 during the return-from-sleep process (if the answer in step S13 is NO and the answer in step S14 is YES), the process performed by the sub CPU 40 in FIG. 10 ends. Then, when the return-from-sleep process is completed, the main CPU 31 starts a snapshot data acquisition process.

However, in the present example, a turn-on operation of the main power switch 39 is performed next time before the process of return from the sleep state Q2 is completed (i.e., during the process of return from the sleep state) (during a period from time T1 to time T10 in FIG. 8). The turn-on operation performed during the return-from-sleep process is detected by the sub CPU 40 that is monitoring the state of the main power switch 39 in, for example, the sleep state Q2 of the MFP 10 (see FIG. 6).

Figure 6:
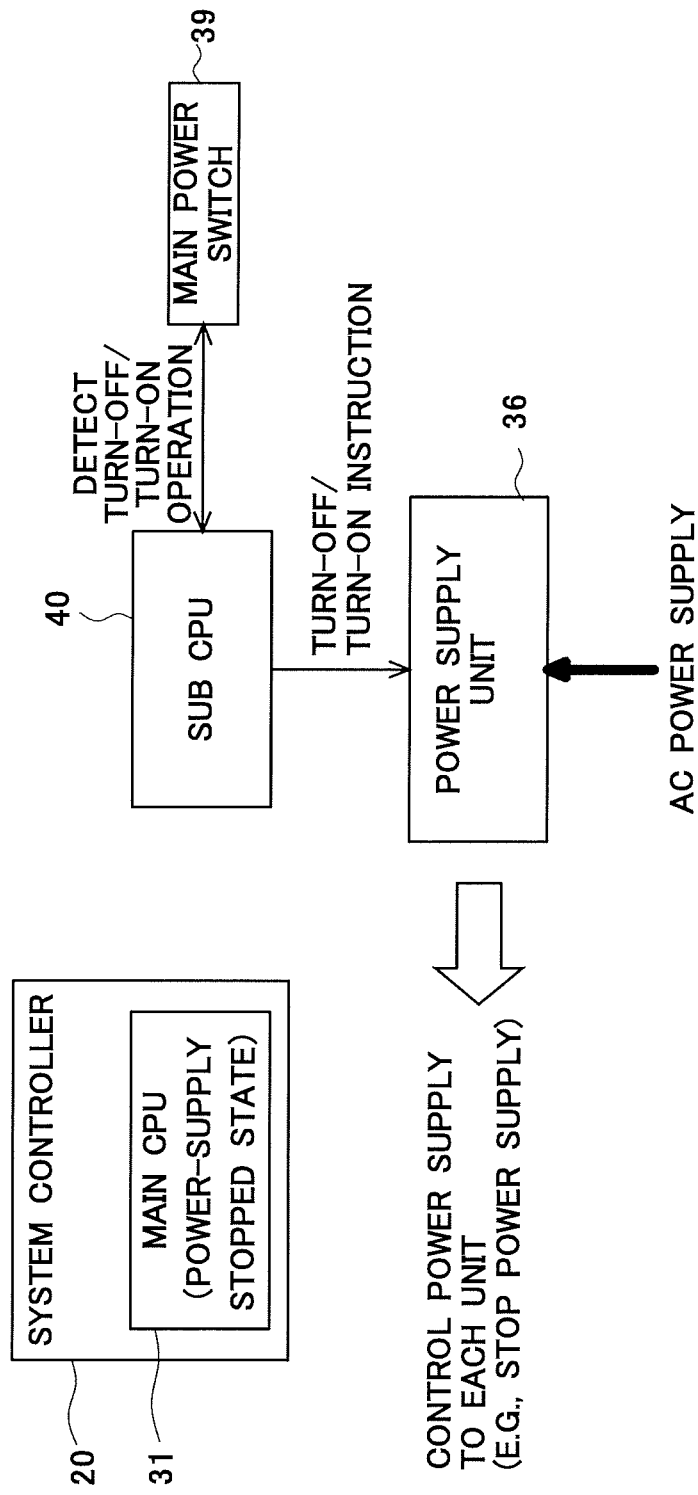
FIG. 6 is a conceptual diagram illustrating operations performed by a sub CPU in, for example, the sleep state.

When the turn-on operation of the main power switch 39 has been detected (time T5) during the return-from-sleep process (the answer in step S13 in FIG. 10 is YES), the sub CPU 40 (forcefully) resets the main CPU 31 (forced reset) (see FIG. 9 and step S15 in FIG. 10) via the power supply unit 36 (FIG. 6).

The main CPU 31 that has been reset is subjected to booting and then immediately starts the second quick startup process or normal warp process (times T50 to T60 in FIG. 9). To be more specific, when the main CPU 31 has determined the absence of the first snapshot data for the first quick startup process and the presence of the second snapshot data for the second quick startup process, the main CPU 31 determines to execute the second quick startup process based on the second snapshot data, and starts the second quick startup process. If the kernel of the main CPU 31 reaches its predetermined state (normal operating state) during the second quick startup process, the main CPU 31 notifies the sub CPU 40 that the kernel has returned to its normal operating state. Based on this notification, the sub CPU 40 determines that the main CPU 31 has substantially returned from the sleep state.

Then, when the second quick startup process is completed, the MFP 10 reaches its normally activated state (ready state) Q1. In this way, the MFP 10 can transition to the ready state Q1 in a relatively short time (approximately 17 seconds) after the turn-on operation (time T5), as compared with the case of the operations illustrated in FIG. 8. The main CPU 31 transmits a notification (i.e., a return-to-activated-state completion notification) indicating that the main CPU 31 has returned to its normally activated state (ready state) to the sub CPU 40.

According to the operations as described above, when a turn-on operation of the main power switch 39 is detected after a turn-off operation of the main power switch 39 is detected in the sleep state Q2 and if this turn-on operation is detected during a period before the return from the sleep state is completed, the sub CPU 40 immediately resets the main CPU 31 in response to this turn-on operation. To be more specific, the main CPU 31 is reset without waiting for completion of the snapshot data acquisition process (to be more specific, without even starting the snapshot data acquisition process). As a result, for example, the process including the second quick startup process (17 seconds) in FIG. 9 takes only approximately 17 to 18 seconds to complete, whereas the process including the first snapshot data acquisition process (20 seconds) and the first quick startup process (9 seconds) in FIG. 8 takes 29 seconds or more to complete. In this way, it is possible to suppress an increase in the starting time of the MFP 10 when a turn-on operation of the main power switch 39 is further performed after the turn-off operation of the main power switch 39 in the sleep state Q2.

In particular, because the main CPU 31 is reset (the snapshot data acquisition process is interrupted) without waiting for even completion of the return-from-sleep process, it is, in particular, possible to suppress an increase in the starting time of the MFP 10.

If the sub CPU 40 is not present, the main CPU 31 is not capable of performing various types of determination operations until the MFP 10 returns from the sleep state (to be more specific, until the kernel of the main CPU 31 returns to a predetermined state). This makes it difficult to even reset the main CPU 31 itself on condition that a turn-off operation of the main power switch 39 is detected.

In contrast, in the above-described first embodiment, even if power supply to the main CPU 31 is stopped in the sleep state Q2, power supply to the sub CPU 40 continues and the sub CPU 40 is capable of performing various types of determination operations. Moreover, not the main CPU 31 but the sub CPU 40 detects turn-on and turn-off operations of the main power switch 39, and it is possible to reset the main CPU 31 upon detection of such an operation on the basis of the determination made by the sub CPU 40. Thus, in particular, even in a state before the kernel of the main CPU 31 returns to a predetermined state (or a state in which the main CPU 31 is not activated) (to be more specific, during a period before the MFP 10 returns from the sleep state, i.e., from times T1 to T10), the sub CPU 40 is capable of performing an operation of resetting the main CPU 31 on its own. Thus, the main CPU 31 can be reset at an extremely early stage. Accordingly, it is, in particular, possible to suppress an increase in the starting time of the MFP 10.

After the main CPU 31 is reset, the MFP 10 is quickly activated (hibernation startup) using the second snapshot data (which is snapshot data acquired in advance separately from the first snapshot data acquired in the first snapshot data acquisition process). Thus, the MFP 10 that has been reset can be activated at a relatively high speed.

In the above-described embodiments, when the MFP 10 is in the ready state Q1, the main CPU 31 detects the operating state of the main power switch 39 and controls power supply to each unit of the MFP 10 according to the operating state of the main power switch 39. The present invention is, however, not limited to this example, and even in the ready state Q1, the sub CPU 40 may control power supply or other operations in cooperation with (or instead of) the main CPU 31 until the main CPU 31 is completely activated after return from the sleep state.

2. Second Embodiment

A second embodiment is a variation of the first embodiment.

In the above-described first embodiment, when a turn-on operation of the main power switch 39 is further detected after a turn-off operation of the main power switch 39 (time T1) is detected in the sleep state Q2 and if this turn-on operation is detected (e.g., time T5) during a period (T1 to T10) before the return from the sleep state Q2 is completed, the main CPU 31 is always reset in response to this turn-on operation as illustrated in FIG. 9.

The present invention is, however, is not limited to this example. For example, the main CPU 31 may be reset in response to the turn-on operation only when another predetermined condition is satisfied. In other words, when the predetermined condition is not satisfied, the main CPU 31 is not reset in response to the turn-on operation, and processes such as the return-from-sleep process and the snapshot data acquisition process may continue. One example of the predetermined condition is that an estimated duration TM2 (see FIG. 9) of the second quick startup process is shorter than a total time TT of an estimated duration TS1 (see FIG. 11) of the first snapshot data acquisition process and an estimated duration TM1 (see FIG. 11) of the first quick startup process (TM2<TS1+TM1).

Figure 11:
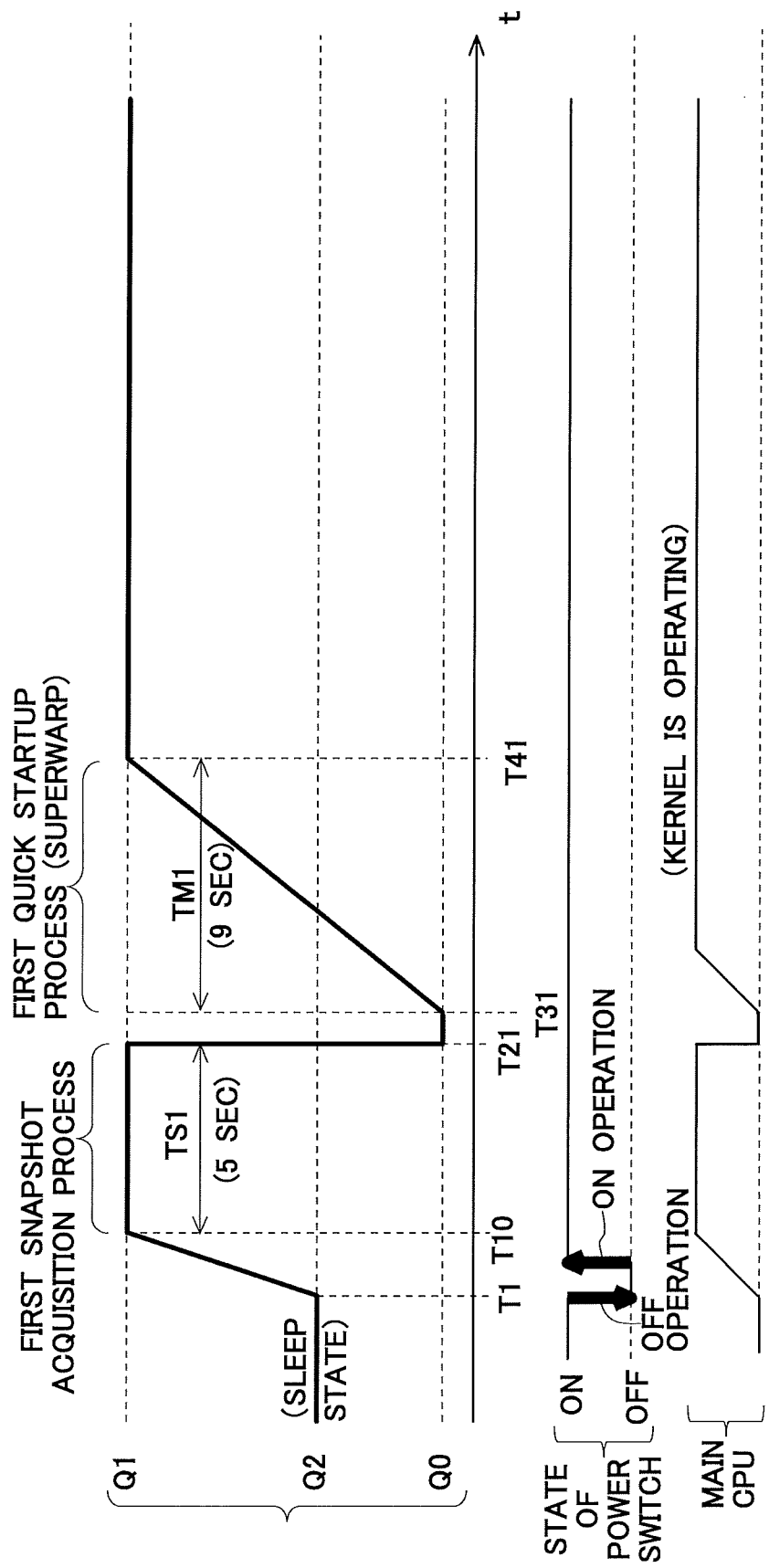
FIG. 11 illustrates an example of operations according to a second embodiment.

Here, the processing time TS1 (see FIGS. 8 and 11) of the first snapshot data acquisition process varies depending on factors such as the processing speed of the main CPU 31 of the MFP 10, the speed of access to nonvolatile memories (e.g., eMMC), and the data compression and/or expansion speed. The processing time TS1 also varies depending on factors such as the types and numbers of devices (optional devices) relating to optional configurations actually mounted on the MFP 10. For example, the processing time TS1 may be relatively long (e.g., 20 seconds) as illustrated in FIG. 8, or may be relatively short (e.g., 5 seconds) as illustrated in FIG. 11. Similarly, the estimated duration TM1 of the first quick startup process also varies.

Due to such circumferences or other factors, for example when the processing time TS1 of the first snapshot data acquisition process is relatively short, operations as illustrated in FIG. 11 may require a shorter time than the operations as illustrated in FIG. 9.

In FIG. 9, the main CPU 31 is reset (immediately) in response to the turn-on operation of the main power switch 39, and then the second quick startup process is performed.

In contrast, in the case of FIG. 11, the main CPU 31 is not immediately reset upon detection of the turn-on operation of the main power switch 39, and the main CPU 31 continues the process (see also FIG. 8). More specifically, the snapshot data acquisition process is executed after the return-from-sleep process is completed, and thereafter, the process corresponding to the turn-on operation of the main power switch 39 is executed (more specifically, the process of resetting the main CPU 31 (times T21 to T31) and the first quick startup process, i.e., quick startup process using the first snapshot data (times T31 to T41)).

For example, a situation is assumed in which the estimated duration TM1 of the first quick startup process is 9 seconds, and the estimated duration TM2 of the second quick startup process is 17 seconds.

In this situation, if the processing time TS1 of the first snapshot data acquisition process is 20 seconds (relatively long) (see FIG. 8), the total time TT of the duration TS1 (20 seconds) of the snapshot data acquisition process TS1 and the duration TM1 (9 seconds) of the first quick startup process is 29 seconds.

In this case, when the processing time TS1 is 20 seconds, the total time TT (29 seconds) is longer than the estimated duration TM2 (17 seconds) of the second quick startup process. Thus, in this case, the processes according to the first embodiment as illustrated in FIG. 9 are preferably performed.

On the other hand, when the processing time TS1 of the first snapshot data acquisition process is 5 seconds (relatively short) (see FIG. 11), the total time TT of the estimated duration TS1 (5 seconds) of the snapshot data acquisition process and the estimated duration TM1 (9 seconds) of the first quick startup process is 14 seconds. When the processing time TS1 is 5 seconds, the total time TT (14 seconds) is shorter than the estimated duration TM2 (17 seconds) of the second quick startup process.

Thus, the operations as illustrated in FIG. 11 are preferably performed in this case (where the processing time TS1 of the first snapshot data acquisition process is 5 seconds).

In view of this, in the second embodiment, the sub CPU 40 also takes such matter into consideration to determine operations that are performed after the turn-on operation of the main power switch 39. More specifically, the sub CPU 40 forcefully resets the main CPU 31 on condition that the estimated duration TM2 of the second quick startup process is shorter than the total time TT of the estimated duration TS1 of the first snapshot data acquisition process and the estimated duration TM1 of the first quick startup process (TM2<TS1+TM1). In other words, when the duration TM2 is longer than the duration TT (=TS1+TM1), the sub CPU 40 does not forcefully reset the main CPU 31, and the main CPU 31 continues the processes (e.g., the return-from-sleep process, the first snapshot data acquisition process, and the first quick startup process).

The details of this embodiment will now be described hereinafter with reference to FIGS. 11 and 12. FIG. 11 illustrates an example of the operations according to the second embodiment, and FIG. 12 is a flowchart of the operations performed by the sub CPU 40 according to the second embodiment.

Figure 12:
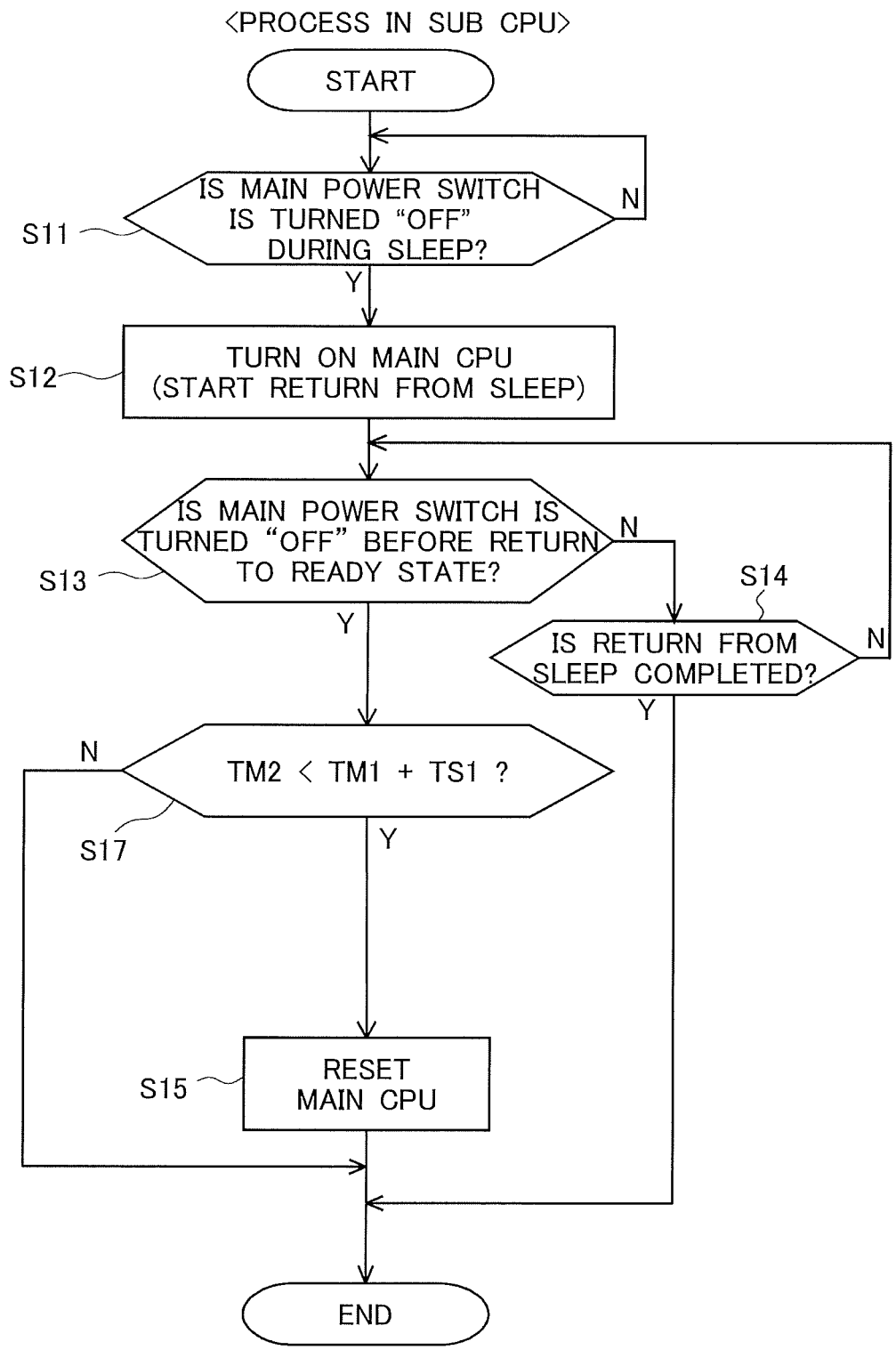
FIG. 12 is a flowchart of operations performed by the sub CPU according to the second embodiment.

As illustrated in FIG. 12, in the second embodiment, each process in steps S11 to S15 is also performed as in the first embodiment. It is, however, noted that a determination process in step S17 is added to FIG. 12. More specifically, when a turn-on operation of the main power switch 39 is detected immediately after detection of a turn-off operation of the main power switch 3 in step S13, the procedure proceeds to step S17. Then, operations to be performed after the turn-on operation of the main power switch 39 are determined based additionally on the determination result in step S17.

In step S17, it is determined whether the estimated duration TM2 of the second quick startup process is shorter (TM2<TT) than the total time TT (=TS1+TM1) of the estimated duration TS1 of the snapshot data acquisition process and the estimated duration TM1 of the first quick startup process. Here, the estimated duration TM1 of the first quick startup process is an estimated value for the duration of the first quick startup process, and the estimated duration TM2 of the second quick startup process is an estimated value for the duration of the second quick startup process. The estimated duration TS1 of the snapshot data acquisition process is an estimated value for the duration of the first snapshot data acquisition process. These values TM1, TM2, and TS1 are each calculated (obtained) in advance, provided as a notification to the sub CPU 40, and stored in a storage area under the control of the sub CPU 40 by the main CPU 31 before the MFP 10 transitions to the sleep state Q2.

If this condition (TM2<TT) is satisfied, the procedure proceeds to step S15. Then, the same operations as in FIG. 9 are performed.

On the other hand, if the condition is not satisfied, the procedure does not proceed to step S15. That is, the main CPU 31 is not reset in response to the turn-on operation of the main power switch 39. In this case, the snapshot acquisition process is executed after completion of the return-from-sleep process, and thereafter, a process corresponding to the turn-on operation of the main power switch 39 (more specifically, process of resetting the main CPU 31 (times T21 to T31) and the first quick startup process or quick startup process using the first snapshot data (times T31 to T41)) is executed as illustrated in FIG. 11.

If equality is satisfied (TM2=TT), either of the operations as illustrated in FIG. 9 and the operations as illustrated in FIG. 11 may be performed.

According to the above-described operations, when the sub CPU 40 has further detected a turn-operation of the main power switch 39 after a turn-off operation of the main power switch 39 is detected in the sleep state Q2 and if a predetermined condition (e.g., TM2<TT) is satisfied in step S17, the sub CPU 40 resets the main CPU 31 as in the first embodiment (see FIG. 9). Then, the main CPU 31 subsequently performs the first quick startup process.

However, if the predetermined condition is not satisfied in step S17, the sub CPU 40 does not reset the main CPU 31. In this case, the main CPU 31 continues and completes the return-from-sleep process and further performs the snapshot data acquisition process and the first quick startup process.

Accordingly, an increase in the starting time of the MFP 10 can be suppressed more reliably. In particular, an increase in the starting time of the MFP 10 will be suppressed more reliably at the time of, for example, changing optional configurations of the MFP 10.

While in the above-described second embodiment, the main CPU 31 notifies the sub CPU 40 of the estimated durations TM1, TM2, and TS1 before its transition to the sleep state, the present invention is not limited to this example. For example, the main CPU 31 may obtain the relation of length between the estimated duration TM2 and the total time TT (=TS1+TM1) of the estimated duration TM1 and the estimated duration TS1, and notify the sub CPU 40 of this relation of length before its transition to the sleep state. Then, the sub CPU 40 may determine, on the basis of this relation of length, whether to forcefully reset the main CPU 31. More specifically, the sub CPU 40 may forcefully reset the main CPU 31 (see FIG. 9) when the sub CPU 40 is notified of the relation of length indicating that the duration TM2 is shorter than the total time TT, and the sub CPU 40 may not forcefully reset the main CPU 31 (see FIG. 11) when the sub CPU 40 is notified of the relation of length indicating that the duration TM2 is longer than the total time TT.

The above-described second embodiment illustrates an example in which the predetermined condition is that the estimated duration TM2 of the second quick startup process is shorter than the total time TT of the estimated duration TS1 of the snapshot data acquisition process and the estimated duration TM1 of the first quick startup process using the first snapshot data.

The present invention is, however, not limited to this example, and for example, the remaining time of the return-from-sleep process (remaining time from the time T5 of the turn-on operation) may be further taken into consideration. More specifically, the above total time F1 may be calculated by further adding the remaining time (e.g., 0.8 seconds) of the return-from-sleep process (remaining time from the time T5 of the turn-on operation) to the estimated duration TS1 and the estimated duration TM1. In this case, more accurate determination is possible.

3. Third Embodiment

A third embodiment is a variation of the first embodiment. The following description primarily focuses on differences from the first embodiment. In the third embodiment, the sub CPU 40 controls power supply not only in the sleep state Q2 but also, in particular, in the state after return from the sleep state (e.g., ready state Q1). More specifically, even in the ready state Q1, the sub CPU 40 controls power supply and other operations in cooperation with the main CPU 31 until activation after return from the sleep state is completed. For example, the sub CPU 40 is capable of performing control such as forcefully resetting the main CPU 31, even after the MFP has returned from the sleep state (see FIG. 6).

The third embodiment assumes a situation (see FIGS. 13 and 14) in which the sub CPU 40 has reset the main CPU 31, and the main CPU 31 has started the second quick startup process as in the first embodiment (see FIG. 9) or other embodiments, as a result of execution of a turn-on operation (second operation) of the main power switch 39 immediately after a turn-off operation (first operation) of the main power switch 39 in the sleep state.

The following is a description of operations that are performed when a second-time turn-off operation (third operation) of the main power switch 39 is performed in the aforementioned situation. This second-time turn-off operation may be performed at a relatively early stage (time T7) after the turn-on operation (second operation) is executed immediately after the first turn-off operation (see FIG. 14), or may be performed at a relatively late stage (time T8) after the turn-on operation (second operation) is executed immediately after the first turn-off operation (see FIG. 13). In the third embodiment, appropriate operations are executed depending on the timing of the second-time turn-off operation. This embodiment will now be described in more detail hereinafter.

When the second-time turn-off operation (third operation) is performed after the sub CPU 40 has reset the main CPU 31, the sub CPU 40 calculates a remaining time in the case where the main CPU 31 continues a planned process (described next) after the second-time turn-off operation. Here, the planned process includes the second quick startup process and the subsequent first snapshot data acquisition process. The second quick startup process is a process of activating the MFP 10 in response to the turn-on operation (second operation), and the subsequent first snapshot data acquisition process is a process of preparation to stop the MFP in response to the second-time turn-off operation (third operation).

Figure 13:
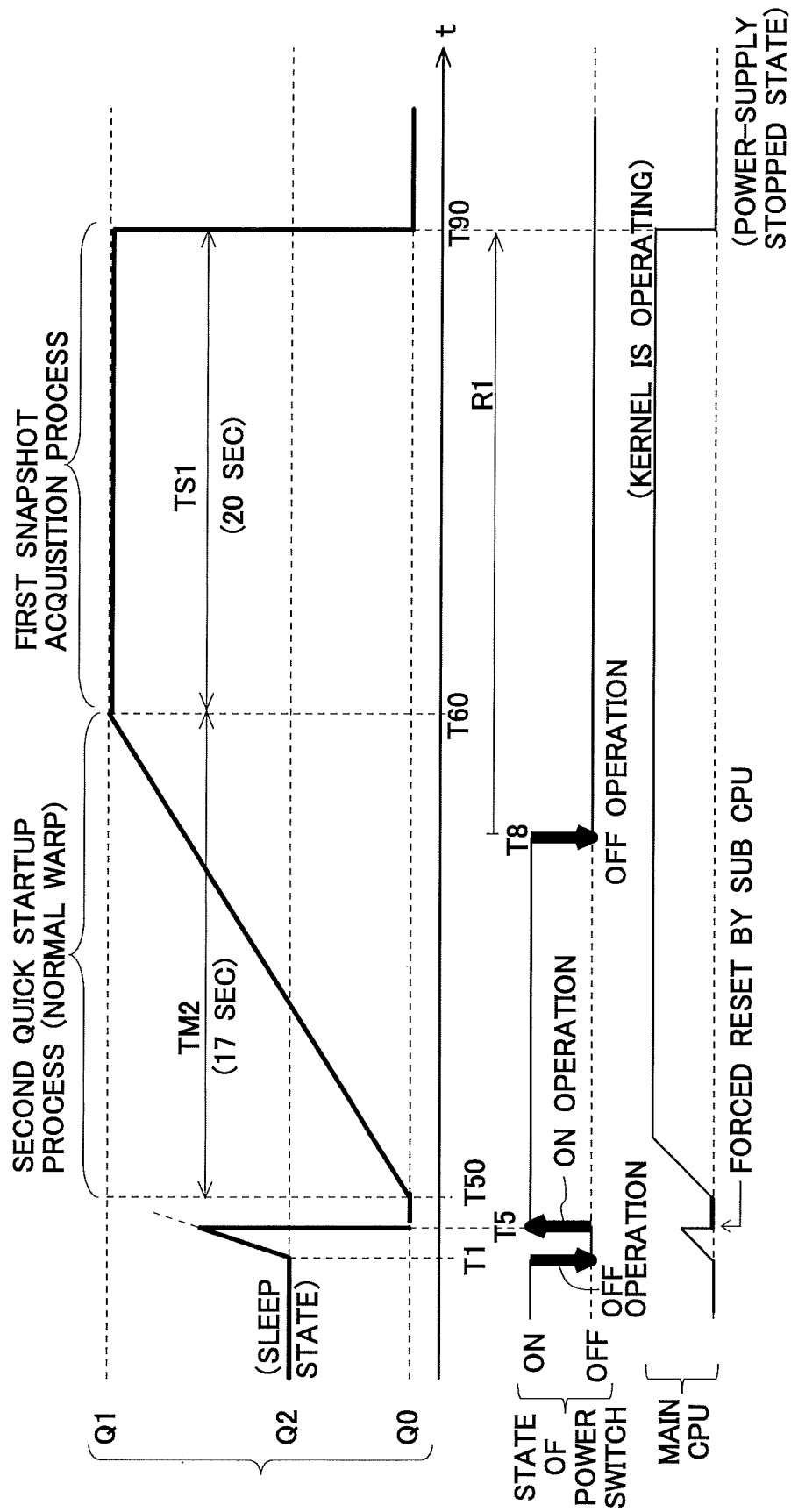
FIG. 13 illustrates an example of operations according to a third embodiment.
Figure 14:
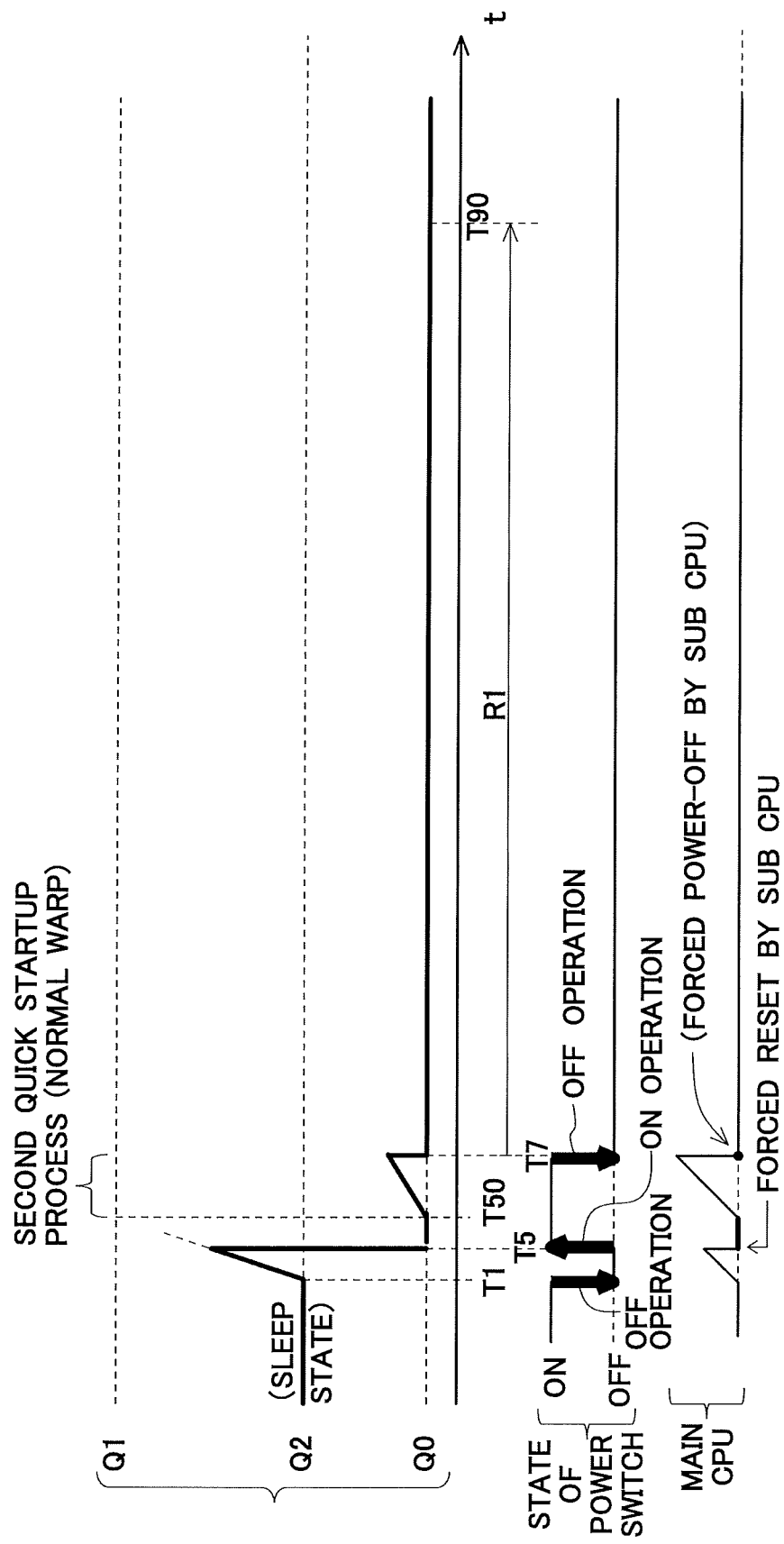
FIG. 14 illustrates another example of operations according to the third embodiment.

More specifically, the sub CPU 40 calculates an estimated value for the remaining time R1 (estimated remaining time) from when the second-time turn-off operation was performed (time T7 or T8) until (predicted time) (time T90) when the second quick startup process and furthermore the first snapshot data acquisition process are completed (see FIGS. 13 and 14). To be more specific, the sub CPU 40 first calculates a total time TG (=TM2+TS1) (e.g., 37 seconds) of the processing time (estimated value) TM2 (e.g., 17 seconds) of the second quick startup process and the processing time TS1 (e.g., 20 seconds) of the first snapshot data acquisition process. The sub CPU 40 then calculates a value obtained by subtracting the time elapsed after the time T1 of the first turn-off operation (or the time T5 of the turn-on operation immediately after the first turn-off operation) from the total time TG. Here, in order to simplify the description, the calculated value is assumed to be the remaining time R1 (i.e., other times such as the remaining time of the return-from-sleep process are ignored). It is assumed that the above values such as TM2 and TS1 are calculated and provided as a notification to the sub CPU 40 by the main CPU 31 before transition to the sleep state as in the second embodiment.

The sub CPU 40 then compares the remaining time R1 with a predetermined threshold value TH1 (e.g., 30 seconds) and performs a process corresponding to the comparison result.

For example, when the second-time turn-off operation is performed with late timing (e.g., 10 seconds after the turn-on operation) as illustrated in FIG. 13, the estimated remaining time R1 from the time of the second-time turn-off operation is calculated as a relatively short time (e.g., 27 seconds). In this case, the sub CPU 40 determines that the main CPU 31 preferably continues the process, and does not force the main CPU 31 to transition to the power-off state.

More specifically, if the remaining time R1 is shorter than the predetermined threshold value TH1 (e.g., 30 seconds), the sub CPU 40 causes the main CPU 31 to continue in the power-on state without forcing the main CPU 31 to transition to the power-off state as illustrated in FIG. 13. The main CPU 31 continues the second quick startup process and the first snapshot data acquisition process. Then, after the first snapshot data acquisition process is completed, power supply to the main CPU 31 and other units is stopped, and accordingly the image forming apparatus 10 transitions to the stopped state Q0. If another turn-on operation of the main power switch 39 is further performed thereafter, the first quick startup process is executed using the first snapshot data, which is acquired in the immediately previous first snapshot data acquisition process (times T60 to T90).

In this way, when a second-time turn-off operation of the main power switch 39 is detected after the main CPU 31 is reset in response to the first turn-on operation of the main power switch 39 (turn-on operation in the sleep state) and if the estimated remaining time R1 is shorter than the predetermined threshold value TH1, the sub CPU 40 causes the main CPU 31 to continue in the power-on state, without forcing the main CPU 31 to transition to the power-off state.

Thus, when the remaining time R1, during which the main CPU continues the planned process and then transitions to the power-off state, is shorter than a predetermined extent, a process of preparation for the next first quick startup process (e.g., first snapshot data acquisition process) is executed, and power is shut off. Accordingly, at the next startup (at startup in response to the next turn-on operation of the main power switch 39), the MFP can be activated at an extremely high speed through the first quick startup (quick startup using the first snapshot data).

On the other hand, when the second-time turn-off operation is performed at a relatively early stage (e.g., two seconds after the turn-on operation) as illustrated in FIG. 14, the estimated remaining time R1 from the time of the second-time turn-off operation is calculated as a relatively long time (e.g., 35 seconds).

If the estimated remaining time R1 is longer than the predetermined threshold value TH1 (e.g., 30 seconds), the sub CPU 40 forces the main CPU 31 to transition to the power-off state.

If power supply continues for a long time in the process of preparation for transition to the power-supply stopped state Q0, irrespective of the operator's power-off instruction to stop power supply, there is a high possibility that the operator feels displeased (or feels uneasiness).

In view of this, in the third embodiment, if the estimated remaining time R1 is longer than the predetermined threshold value TH1, the sub CPU 40 forces the main CPU 31 to transition to the power-off state. When another turn-on operation of the main power switch 39 is further performed thereafter, the second quick startup process is executed using the second snapshot data acquired in advance (because the first snapshot data was not acquired at the timing of the previous turning off).

In this way, when the second-time turn-off operation of the main power switch 39 is detected after the main CPU 31 is reset in response to the first turn-off operation of the main power switch 39 (turn-off operation in the sleep state) and the subsequent turn-on operation and if the estimated remaining time R1 is longer than the predetermined threshold value TH1, the sub CPU 40 forces the main CPU 31 to transition to the power-off state (see FIG. 14).

Thus, when the remaining time R1 until the main CPU 31 substantially transitions to the power-off state is longer than a predetermined extent, the sub CPU 40 forces the main CPU 31 to immediately transition to the power-off state. This shortens the amount of time required for the MFP to transition to the power-supply stopped state Q0 (e.g., shortens the amount of time from 35 seconds to almost zero seconds). Accordingly, it is possible to avoid or reduce the occurrence of a situation in which the user feels displeased. In other words, it is possible to improve the level of operator satisfaction by giving higher priority to the transition of the MFP to the power-off state Q0 in response to the current turn-off operation than to a reduction in the starting time in response to the next turn-on operation of the main power switch 39.

If equality (R1=TH1) is satisfied, any of the processes (the process in FIG. 13 and the process in FIG. 14) may be performed.

While the idea of the third embodiment is described as an example variation of the first embodiment, the present invention is not limited to this example, and the idea of the third embodiment may be implemented in combination with the second embodiment. More specifically, whether to reset the main CPU 31 may be determined in association with the determination process in step S17. Then, the idea of the above-described third embodiment may be applied to the case where the second-time turn-off operation is performed after the main CPU 31 is reset.

4. Variations

While the above has been a description of embodiments of the present invention, the present invention is not limited to the content described above.

For example, while in the above-described embodiments, the second quick startup (times T50 to T60) is performed (see FIG. 9) after the main CPU 31 is forcefully reset by the sub CPU 40 (time T5), the present invention is not limited to this example, and normal startup (non-hibernation startup) may be performed after the reset.

In the above-described embodiments (see, for example, FIG. 9), when the return-from-sleep process is completed after the turn-off operation of the main power switch 39, the main CPU 31 is not immediately reset, and the first snapshot acquisition process and other processes are subsequently performed (times T10 to T40) as in FIG. 8. In other words, when the main power switch 39 is turned on after completion of the return-from-sleep process, the main CPU 31 is not immediately reset. The present invention is, however, not limited to this example, and the main CPU 31 may be immediately reset even if the main power switch 39 is turned on after completion of the return-from-sleep process.

For example, when the main power switch 39 is turned on (e.g., time T15) during execution (before completion) of the first snapshot data acquisition process that is performed after the return from the sleep state (time T10) as illustrated in FIG. 15, the main CPU 31 may be immediately reset.

In this case, since the main power switch 39 is turned on after the return-from-sleep process, the kernel of the main CPU 31 has already returned to a predetermined state (normal operating state) at the time of the turning on. Thus, the main CPU 31 may determine whether to continue or interrupt the snapshot data acquisition process (i.e., to the main CPU 31 itself), on the basis of, for example, the progress of the snapshot data acquisition process. For example, the main CPU 31 may be reset as illustrated in FIG. 15 when a condition is satisfied that the total time R2 (see FIG. 8) of the remaining time (times T15 to T20) of (the estimated value for) the processing time of the first snapshot data acquisition process and (the estimated value for) the processing time of the first quick startup process (times T30 to T40) is longer than the processing time of the second quick startup process (see FIG. 15).

Alternatively, as in the above-described embodiments, the sub CPU 40 may make this determination (e.g., determine whether to continue the first snapshot data acquisition process) or perform other processes, and the sub CPU 40 may reset the main CPU 31 via the power supply unit 36 or other units. In this case, the sub CPU 40 may be configured such that the sub CPU 40 is capable of resetting the main CPU 31 via the power supply unit 36 or other units as illustrated in FIG. 6, even if the MFP 10 is in the ready state Q1. In this case as well, the sub CPU 40 may reset the main CPU 31 as illustrated in FIG. 15, for example when the aforementioned total time R2 (see FIG. 8) is longer than the processing time of the second quick startup process (see FIG. 15).

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus having an OFF state, a ready state in which the image forming apparatus forms images, and a power-saving state, the image forming apparatus comprising:
    a main hardware processor configured to control a first snapshot data acquisition process in which, in response to a turn-off operation to turn the image forming apparatus to the OFF state, to-be-saved information regarding the image forming apparatus is stored as first snapshot data in a nonvolatile storage device; and
    a sub hardware processor capable of monitoring an operating state of the main power switch in when the image forming apparatus is in the power-saving state,
    wherein the main hardware processor is configured to, in response to receiving the turn-off operation while the main hardware processor is in the power-saving state, start a return process, the return process causing a state of the image forming apparatus to return from the power-saving state directly to the ready state in which the main hardware processor is able to execute the first snapshot data acquisition process, and
    when a turn-on operation to turn the image forming apparatus to the ready state is detected after the turn-off operation is detected in the power-saving state and before the return process of returning from the power-saving state to the ready state is completed, the sub hardware processor is configured to:
        interrupt the return process and reset the main hardware processor to the OFF state in response to detection of the turn-on operation, and
        after the main hardware processor has been reset to the OFF state, perform startup process in which the image forming apparatus is activated by using previously acquired data to reduce a starting time.

2. The image forming apparatus according to claim 1, wherein
    in a case where the turn-on operation is detected after the return process of return from the power-saving state is started and before the return process is completed, the sub hardware processor resets the main hardware processor on condition that an estimated duration of the second quick startup process is shorter than a total time of an estimated duration of the first snapshot data acquisition process and an estimated duration of a first quick startup process using the first snapshot data.

3. The image forming apparatus according to claim 2, wherein
    the main hardware processor obtains the estimated duration of the second quick startup process, the estimated duration of the first snapshot data acquisition process, and the estimated duration of the first quick startup process and notifies the sub hardware processor of each estimated duration, immediately before the main hardware processor transitions to the power-saving state.

4. The image forming apparatus according to claim 2, wherein
    the main hardware processor obtains a relation of lengths between the estimated duration of the second quick startup process and the total time of the estimated duration of the first snapshot data acquisition process and the estimated duration of the first quick startup process, and notifies the sub hardware processor of the relation of length, immediately before the main hardware processor transitions to the power-saving state.

5. The image forming apparatus according to claim 1, wherein
    in a case where a second-time turn-off operation to turn off the main power switch is detected after the main hardware processor has been reset in response to the turn-on operation of the main power switch, the sub hardware processor forces the main hardware processor to transition to a power-off state, on condition that an estimated remaining time is longer than a predetermined threshold value, the estimated remaining time being a remaining time until the second quick startup process performed after the turn-on operation is completed and the first snapshot data acquisition process subsequently performed is completed.

6. The image forming apparatus according to claim 5, wherein
in a case where a second-time turn-off operation to turn off the main power switch is detected after the main hardware processor has been reset in response to the turn-on operation of the main power switch and if the estimated remaining time is shorter than the predetermined threshold value, the sub hardware processor causes the main hardware processor to continue in a power-on state, without forcing the main hardware processor to transition to a power-off state.

7. The image forming apparatus according to claim 1, wherein
in a case where a turn-on operation to turn on the main power switch is detected after the turn-off operation is detected in the power-saving state, after the return process of return from the power-saving state is completed, and before the first snapshot data acquisition process is completed and if a predetermined condition is satisfied, the sub hardware processor resets the main hardware processor in response to the turn-on operation.

8. The image forming apparatus according to claim 1, wherein, when the sub hardware processor resets the main hardware processor in response to the turn-on operation, the main hardware processor is activated.

9. A method for controlling an image forming apparatus having an OFF state, a ready state in which the image forming apparatus forms images, and a power-saving state, the image forming apparatus comprising:
a main hardware processor configured to control a first snapshot data acquisition process in which, in response to a turn-off operation to turn the image forming apparatus to the OFF state, to-be-saved information regarding the image forming apparatus is stored as first snapshot data in a nonvolatile storage device; and
a sub hardware processor capable of monitoring an operating state of the main power switch in when the image forming apparatus is in the power-saving state,
the control method comprising:
a) in response to receiving the turn-off operation while the main hardware processor is in the power-saving state, causing the main hardware processor to start a return process, the return process causing a state of the image forming apparatus to return from the power-saving state directly to the ready state in which the main hardware processor is able to execute the first snapshot data acquisition process; and
b) when a turn-on operation to turn the image forming apparatus to the ready state is detected after the turn-off operation is detected in the power-saving state and before the return process of returning from the power-saving state to the ready state is completed, causing the sub hardware processor to interrupt the return process and reset the main hardware processor in response to the turn-on operation, and
wherein after the main hardware processor has been reset to the OFF state, perform a startup process in which the image forming apparatus is activated by using previously acquired data to reduce a starting time.

10. The method according to claim 9, wherein, when the sub hardware processor resets the main hardware processor in response to the turn-on operation, the main hardware processor is activated.

11. A non-transitory computer-readable recording medium that records a program for controlling an image forming apparatus having an OFF state in which the image forming apparatus forms images, a ready state, and a power-saving state and that comprises a main hardware processor and a sub hardware processor to execute an operation,
the main hardware processor being configured to control a first snapshot data acquisition process in which, in response to a turn-off operation to turn the image forming apparatus to the OFF state, to-be-saved information regarding the image forming apparatus is stored as first snapshot data in a nonvolatile storage device, and
the sub hardware processor being capable of monitoring an operating state of the main power switch when the image forming apparatus is in the power-saving state,
the operation includes:
a) in response to receiving the turn-off operation while the main hardware processor is in the power-saving state, causing the main hardware processor to start a return process, the return process causing a state of the image forming apparatus to return from the power-saving state directly to the ready state in which the main hardware processor is able to execute the first snapshot data acquisition process; and
b) when a turn-on operation to turn the image forming apparatus to the ready state is detected after the turn-off operation is detected in the power-saving state and before the return process of returning from the power-saving state to the ready state is completed, causing the sub hardware processor to interrupt the return process and reset the main hardware processor in response to the turn-on operation, and
wherein after the main hardware processor has been reset to the OFF state, perform a startup process in which the image forming apparatus is activated by using previously acquired data to reduce a starting time.

12. The non-transitory computer-readable recording medium according to claim 11, wherein, when, the sub hardware processor resets the main hardware processor in response to the turn-on operation, the main hardware processor is activated.

* * * * *